United States Patent [19]
Saitou et al.

[11] Patent Number: 5,088,582
[45] Date of Patent: Feb. 18, 1992

[54] ENGINE BRAKE CONTROLLING APPARATUS USING A LOCK-UP SYSTEM

[75] Inventors: Yoshitami Saitou; Nobuyuki Isono; Nobuyasu Suzumura, all of Aichi, Japan

[73] Assignee: Aisin Seiki K.K., Aichi, Japan

[21] Appl. No.: 754,256

[22] Filed: Aug. 27, 1991

Related U.S. Application Data

[63] Continuation of Ser. No. 498,067, Mar. 23, 1990, abandoned.

[30] Foreign Application Priority Data

Mar. 25, 1989 [JP] Japan ................................. 1-073189
Mar. 25, 1989 [JP] Japan ................................. 1-073190

[51] Int. Cl.$^5$ ..................... B60K 41/28; F16H 61/14
[52] U.S. Cl. .............................. 192/0.055; 192/0.094; 192/3.31; 74/890; 364/424.1
[58] Field of Search ............... 192/0.032, 0.033, 0.044, 192/0.055, 0.076, 0.094, 0.096, 3.28, 3.29, 3.3, 3.31, 103 R; 74/890; 475/65; 364/424.1, 426.01

[56] References Cited

U.S. PATENT DOCUMENTS 4,478,322 10/1984 Carlson et al. .................... 192/0.055
4,760,761 8/1988 Nishikawa et al. ............ 192/3.31 X
4,768,635 9/1988 Sakurai et al. ................. 192/3.31 X

*Primary Examiner*—Richard Lorence
*Attorney, Agent, or Firm*—Sughrue, Mion, Zinn, Macpeak & Seas

[57] ABSTRACT

In a vehicle having a torque converter and a lock-up clutch for effecting engagement and disengagement between input and output shafts of the torque converter, an engine brake controlling apparatus provides engine brake control independently of vehicle speed and includes a device for detecting the number of revolutions of the input shaft of the torque converter; a device for detecting the number of revolutions of the output shaft of the torque converter; and a control device for allowing the lock-up clutch to be engaged when the number of revolutions of the output shaft has exceeded the number of revolutions of the input shaft and for releasing the lock-up clutch when brake operation is detected.

1 Claim, 17 Drawing Sheets

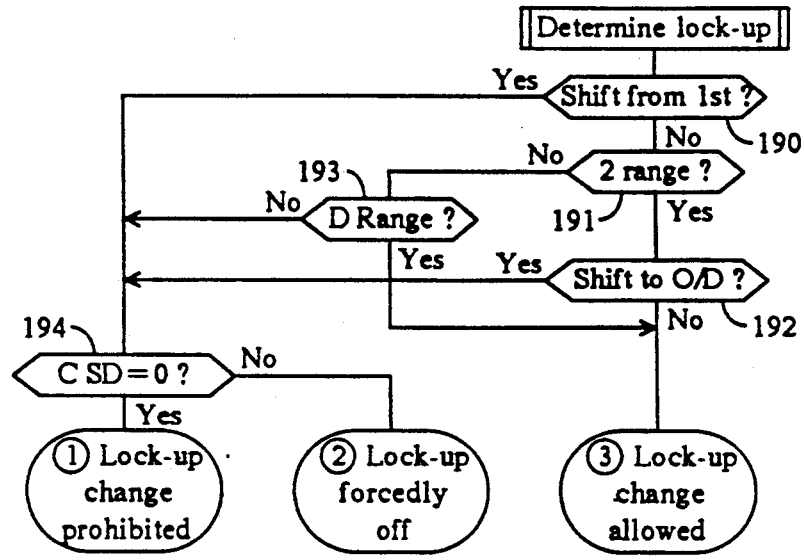

|  |  | P | R | N | D | 2 | L |
|---|---|---|---|---|---|---|---|
| 1st | CSD=0 | Prohibited | Prohibited | Prohibited | Prohibited | Prohibited | Prohibited |
|  | CSD=1 | Off | Off | Off | Off | Off | Off |
| 2nd | CSD=0 | Prohibited | Prohibited | Prohibited | Allowed | Allowed | Prohibited |
|  | CSD=1 | Off | Off | Off | Allowed | Allowed | Off |
| 3rd | CSD=0 | Prohibited | Prohibited | Prohibited | Allowed | Allowed | Prohibited |
|  | CSD=1 | Off | Off | Off | Allowed | Allowed | Off |
| O/D | CSD=0 | Prohibited | Prohibited | Prohibited | Allowed | Prohibited | Prohibited |
|  | CSD=1 | Off | Off | Off | Allowed | Allowed | Off |

FIG. 12

|  | Current Shift Stage | | |
|---|---|---|---|
|  | 2nd | 3rd | O/D |
| SDY3 | 75% | 80% | 90% |
| SDY2 | 60% | 60% | 80% |
| SDY1 | 40% | 50% | 70% |

FIG. 13

| Range=D, Current Shift Stage=O/D | | | | | |
|---|---|---|---|---|---|
| Throttle Opening | OFF→ON | | | | ON →OFF |
|  | 0% →SDY1 | SDY1 →SDY2 | SDY2 →SDY3 | SDY3 →100% |  |
| $\theta 7$ | 5200 | 5300 | 5400 | 5500 | 4600 |
| $\theta 6$ | 4200 | 4300 | 4400 | 4500 | 4000 |
| $\theta 5$ | 3600 | 3700 | 3800 | 3900 | 3400 |
| $\theta 4$ | 3600 | 3700 | 3800 | 3900 | 3400 |
| $\theta 3$ | 3000 | 3100 | 3200 | 3300 | 2800 |
| $\theta 2$ | 3000 | 3100 | 3200 | 3300 | 2800 |
| $\theta 1$ | 2300 | 2400 | 2500 | 2600 | 2200 |
| $\theta 0$ | 2000 | 2100 | 2200 | 2300 | 1700 |

(UNIT:rpm)

(Enlarged view of portion A)

FIG. 17

| Throttle Opening | Shift | | | |
|---|---|---|---|---|
| | 2→3 | 3→4 | 4→3 | 3→2 |
| θ 7 | 80% | 85% | 85% | 80% |
| θ 6 | 75% | 80% | 80% | 75% |
| θ 5 | 75% | 80% | 80% | 75% |
| θ 4 | 75% | 80% | 80% | 75% |
| θ 3 | 75% | 80% | 80% | 75% |
| θ 2 | 75% | 80% | 80% | 75% |
| θ 1 | 75% | 80% | 80% | 75% |
| θ 0 | 70% | 75% | 75% | 70% |

ENGINE BRAKE CONTROLLING APPARATUS USING A LOCK-UP SYSTEM

This is a continuation of application Ser. No. 07/498,067 filed Mar. 23, 1990 now abandoned.

BACKGROUND OF THE INVENTION

The present invention relates to an engine brake controlling apparatus for controlling an engine brake by operating a lock-up clutch of an electronically controlled automatic transmission mounted on a vehicle.

Conventionally, a known technique is arranged such that a vehicle having a torque converter is provided with a lock-up clutch for effecting engagement and disengagement between input and output shafts of the torque converter in correspondence with a running state so as to realize low fuel consumption for the vehicle. This type of technique is disclosed in, for instance, Japanese Patent Laid-Open No. 35858/1981.

In a vehicle equipped with an automatic transmission, a speed-change stage is automatically determined in correspondence with a running state. If the driver returns an acceleration pedal in an attempt to reduce the vehicle speed, an engine brake is applied when the vehicle speed is greater than the engine speed. At this time, unless the lock-up clutch is engaged, the torque converter slips, so that the engine brake works less effectively than in a case where the lock-up clutch is engaged.

Accordingly, it is conceivable to provide an arrangement in which, in order to improve the efficiency of the engine brake, the lock-up clutch is made to engage when the number of revolutions of an output shaft of the torque converter has exceeded the number of revolutions of an input shaft thereof, thereby improving the working of the engine brake.

In this case, however, there is the possibility that, if a brake pedal is pressed suddenly, the engine stalls simultaneously with the locking of the wheels.

SUMMARY OF THE INVENTION

Accordingly, it is a primary object of the present invention to provide an engine brake controlling apparatus using a lock-up clutch in which the efficiency of an engine brake is improved.

Another object of the present invention is to provide an engine brake controlling apparatus using a lock-up clutch in which the working of an engine brake can be adjusted as desired by the driver.

To these ends, in accordance with one aspect of the invention, there is provided an engine brake controlling apparatus in which the lock-up clutch is engaged when the number of revolutions of the output shaft of the torque converter has exceeded the number of revolutions of the input shaft thereof.

In accordance with another aspect of the invention, there is provided an engine brake controlling apparatus in which the lock-up clutch is engaged when the number of revolutions of output shaft of the torque converter has exceeded the number of revolutions of the input shaft thereof only when an amount of the accelerator pedal pressed down is small.

In accordance with the above-described arrangements, the lock-up clutch is engaged when the number of revolutions of the output shaft of the torque converter has exceeded the number of revolutions of the input shaft thereof. Accordingly, since the output shaft of the engine is coupled with the axles without mediation of the torque converter, so that the engine acts as a load with respect to the rotation of the wheels, so that the efficiency of the engine brake improves.

In addition, since control can be selected in correspondence with the amount of the accelerator pedal pressed down, the driver is capable of select the degree of working of the engine brake.

Still another object of the present invention is to provide an engine brake controlling apparatus using a lock-up clutch in which the engine is prevented from stalling even if a brake pedal is pressed while the engine brake is being controlled.

In accordance with this aspect of the invention, there is provided an engine brake controlling apparatus comprising a brake detecting means for detecting a braking operation so as to release the lock-up clutch when the braking operation has been effected.

According to the above-described arrangement, since the lock-up clutch is released immediately upon pressing down the brake pedal, the engine is prevented from stalling even when the brakes are jammed. The present invention relates to a vehicle having an automatic transmission with several drive ratios, a torque converter and a lock-up clutch for effecting engagement and disengagement between input and output shafts of the torque converter, and an engine brake controlling apparatus for providing engine brake control independently of the vehicle's speed. The brake controlling apparatus includes a first detecting device for detecting the number of revolutions of the input shaft of the torque converter; a second detecting device for detecting the number of revolutions of the output shaft of the torque converter; an accelerator pedal detecting device for detecting a position of an accelerator pedal; a brake detecting device for detecting a brake operation of the vehicle; and a control device, connected to the first and second detecting devices, to the acceleration pedal detecting device, and to the brake detecting device, for comparing the number of revolutions detected by the first and second detecting devices. The control device includes a device for allowing the lock-up clutch to be engaged when the number of revolutions of the output shaft has exceeded the number of revolutions of the input shaft and the accelerator pedal is detected to be in a fully released position, and a device for releasing the lock-up clutch when the braking operation is detected by the braking detecting device while the device for allowing the lock-up clutch to be engaged is engaging the lock-up clutch.

The above and other objects, features, and advantages of the invention will become more apparent from the following detailed description of the invention when read in conjunction with the accompanying drawings.

BRIEF DESCRIPTION OF THE DRAWINGS

FIGS. 9 and 10 are detailed flowcharts of a lock-up determination routine and an engine brake control determination routine shown in FIG. 7 or 8, respectively;

FIG. 11 is a table illustrating criteria for determining a lock-up in accordance with the embodiment;

FIGS. 12 and 17 are tables for determining a duty ratio of the lock-up in accordance with the embodiment;

FIG. 13 is a table illustrating the vehicle speed indicating a lock-up line in accordance with the embodiment;

DESCRIPTION OF THE EMBODIMENT

Referring now to the accompanying drawings, a description will be given of an embodiment of the present invention. In this embodiment, control of a lock-up clutch is effected simultaneously in a control circuit of an automatic transmission. As a main body of the automatic transmission, one with four speeds (with overdrive) is used.

Figure 1:
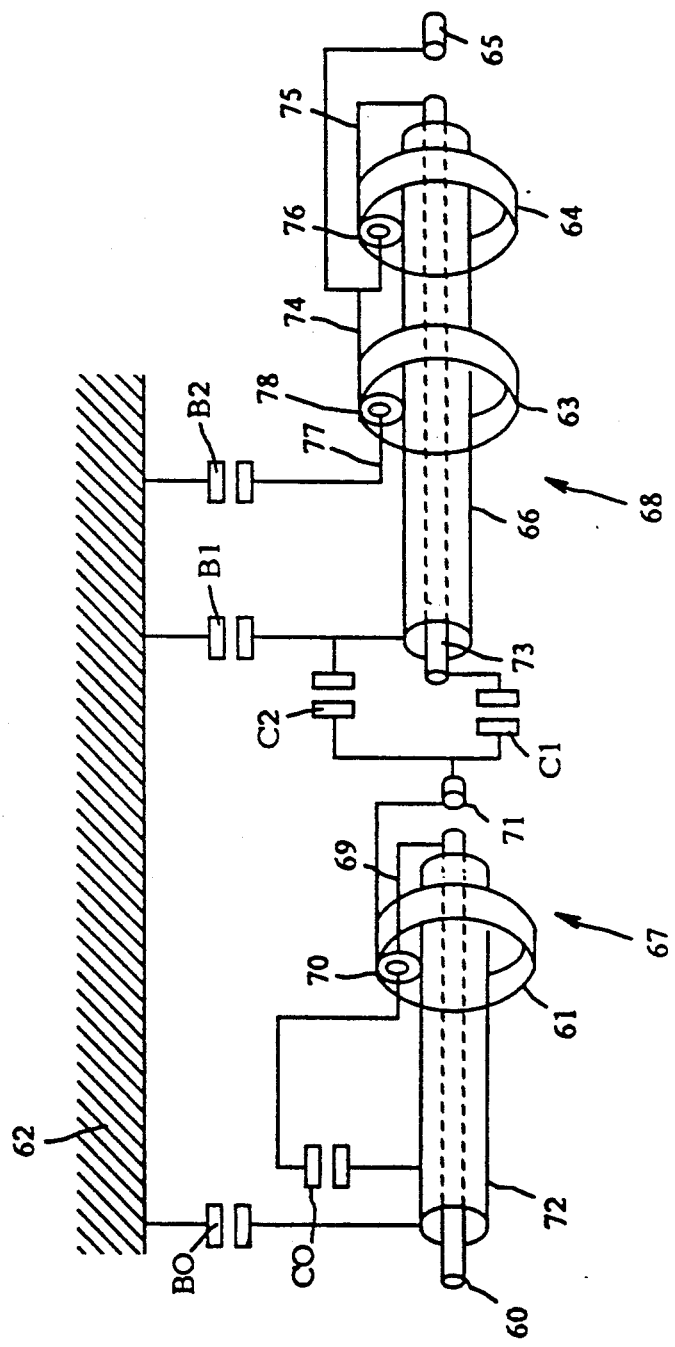
FIG. 1 is a diagram schematically illustrating an automatic transmission of an electronically controlled automatic transmission apparatus to which an engine brake controlling apparatus in accordance with an embodiment of the present invention is applied.

Referring to FIG. 1, a description will be given of the operation of the automatic transmission. A turbine shaft 60, i.e., an input shaft of an overdrive mechanism 67, is coupled with an engine via a torque converter. The turbine shaft 60 serves as an output shaft of the torque converter. The turbine shaft 60 is connected to a carrier 69 of a planetary gear. A planetary pinion 70 supported rotatably by the carrier 69 is connected to an input shaft 71 of a gear transmission mechanism 68 via an OD planetary gear 61. In addition, the planetary pinion 70 meshes with a sun gear 72. An OD clutch C0 is interposed between the carrier 69 and the sun gear 72. An OD brake B0 is interposed between the sun gear 72 and a housing 62. A forward clutch C1 is interposed between the input shaft 71 and intermediate shaft 73 of the gear transmission mechanism 68. Meanwhile, a direct clutch C2 is interposed between the input shaft 73 and a sun gear shaft 66. A second brake B1 is interposed between the sun gear shaft 66 and the housing 62. A planetary pinion 76 supported rotatably by a carrier 74 connected to an output shaft 65 is connected to the intermediate shaft 73 via a gear and a carrier 75. Furthermore, the planetary pinion 76 meshes with the sun gear shaft 66. A planetary pinion 78 meshes with the carrier 74 and the sun gear shaft 66. A 1st and Rev brake B2 is interposed between the planetary pinion 78 and the housing 62.

In this automatic transmission, the relationship between the clutches C0, C1, C2, the brakes B0, B1, B2, and the speed-change stages are shown in the table below.

TABLE 1

| | State of Clutches and Brakes | | | | | |
|---|---|---|---|---|---|---|
| | C0 | C1 | C2 | B0 | B1 | B2 |
| R | O | x | O | x | x | x |

TABLE 1-continued

| | State of Clutches and Brakes | | | | | |
|---|---|---|---|---|---|---|
| | C0 | C1 | C2 | B0 | B1 | B2 |
| P, N | O | x | x | x | x | x |
| O/D | x | O | O | O | x | x |
| 3rd | O | O | O | x | x | x |
| 2nd | O | O | x | x | O | x |
| 1st | O | O | x | x | x | O |

O: engaged
x: disengaged

Figure 2:
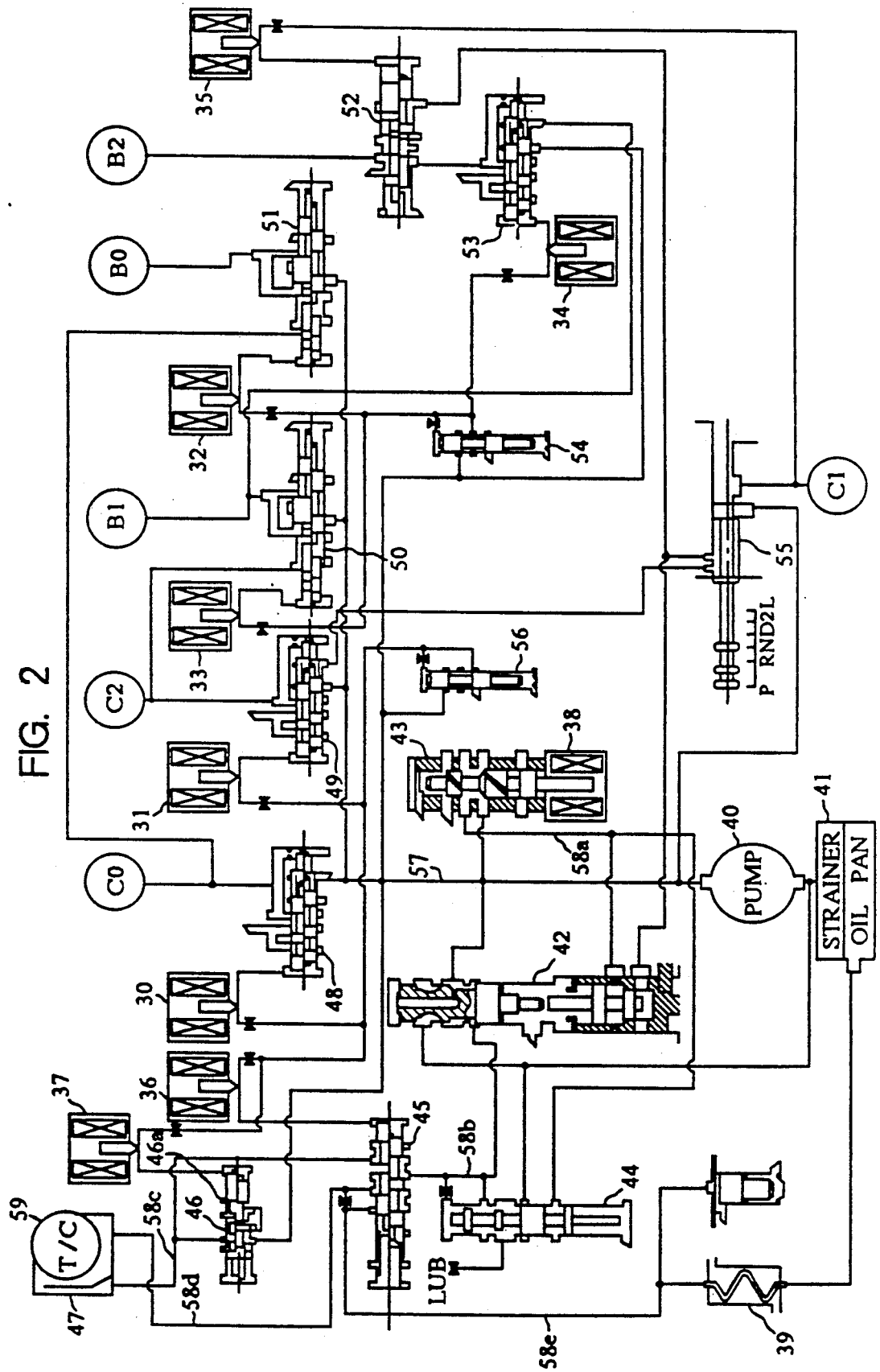
FIG. 2 is a diagram of a hydraulic circuit for driving the automatic transmission shown in FIG. 1.

The engagement and disengagement of the clutches C0, C1, C2 and the brakes B0, B1, B2 are controlled by the hydraulic circuit shown in FIG. 2.

Referring to FIG. 2, a hydraulic fluid pumped up by a hydraulic pump 40 from a sump 41 is supplied to a line 57. The hydraulic pressure (line pressure) of the line 57 is regulated by the operation of a first regulator valve 42 and a throttle valve 43 which is controlled by a line pressure controlling solenoid 38. The line pressure-controlling solenoid 38 is subjected to duty ratio control. A pulse signal of a predetermined period is applied to the line pressure-controlling solenoid 38, and the position of its movable core is determined in correspondence with an "on" period of the pulse signal. The movable core adjusts the orifice diameter of the throttle valve 43. Since the orifice diameter is changed, the hydraulic pressure inside a fluid passage 58a can be controlled. The valve of the first regulator valve 42 is driven by the hydraulic pressure inside the fluid passage 58a and is adapted to regulate the hydraulic pressure inside the line 57. Accordingly, by changing the "on" period of a pulse signal, it is possible to adjust the line pressure. The hydraulic pressure inside the line 57 is supplied via a first modulator valve 56 to a solenoid valve 30 for controlling the clutch C0, a solenoid valve 31 for controlling the clutch C2, a solenoid valve 36 for a lock-up relay, and a solenoid valve 37 for controlling the lock-up duty. In addition, the hydraulic pressure inside the line 57 is supplied via a second modulator valve 54 to a solenoid valve 32 for controlling the brake B0, a solenoid valve 33 for controlling the brake B1, and a solenoid valve 34 for controlling the brake B2. Furthermore, the hydraulic pressure inside the line 57 is supplied to a lock-up control valve 46 and manual valves 48, 49, 50, and 51. A lock-up clutch 47, the clutch C0, the clutch C2, the brake B1, and the brake B0 are respectively connected to outputs of the lock-up control valve 46 and the manual valves 48, 49, 50, and 51. An output of a manual valve 53 is connected to the brake B2 via a valve 52. The valve 52 is connected to a shift valve 55 via a solenoid valve 35 for prohibiting low and reverse. The shift valve 55 moves in response to the movement of a shift lever so that the line pressure will be applied to its interior when the shift lever is in a range other than a "P" range. The shift valve 55 applies hydraulic pressure to the clutch C1 when the shift lever is in a range other than "R", "P", and "N" ranges. Also, the shift lever supplies hydraulic pressure to the valve 52 when the shift lever is in an "L" or "2" range, and it supplies hydraulic pressure to the solenoid valve 35 for prohibiting low and reverse when the shift lever is in the "L" or "R" range.

By virtue of the above-described arrangement, when the solenoid valve 30 for controlling the clutch C0 is closed, the manual valve 48 discharges the fluid in the line connected to the clutch C0. In this case, therefore, the clutch C0 does not operate. When the solenoid valve 30 is closed, the manual valve 48 connects or disconnects the line 57 and the line connected to the clutch C0 in correspondence with a difference between the hydraulic pressure inside the line connected to the clutch C0 and the hydraulic pressure inside the line connected to the solenoid valve 30. Accordingly, the hydraulic pressure applied to the clutch C0 is regulated in response to the pressure outputted by the solenoid valve 30. The output pressure of the solenoid valve 30 is regulated as energization thereto is subjected to duty control. Thus, if the solenoid valve 30 for controlling the clutch C0 is opened, the valve of the manual valve 48 moves, and pressure corresponding to the operation of the solenoid valve 30 for controlling the clutch C0, thereby causing the clutch C0 to be engaged. If the solenoid valve 30 for controlling the clutch C0 is closed, no hydraulic pressure is applied to the clutch C0, so that the clutch C0 is released.

When the shift lever is in a range other than the "R", "P" and "N" ranges, hydraulic pressure is applied to the clutch C1 and thereby causes the clutch C1 to be engaged, whereas when the shift lever is in one of the ranges other than those mentioned above, no hydraulic pressure is applied to the clutch C1, which therefore remains disengaged.

In the case of the clutch C2, if the solenoid valve 31 for controlling the clutch C2 is opened, the needle of the manual valve 49 moves in the same way as with the clutch C1, which in turn causes hydraulic pressure to be applied to the clutch C2, thereby causing the clutch C0 to be engaged. The state of engagement of the clutch C0 can be controlled by the state of energization of the solenoid valve 31 for controlling the clutch C2. If the solenoid valve 31 for controlling the clutch C2 is closed, no hydraulic pressure is applied to the clutch C2, thereby releasing the clutch C2. In the case of the "L" or "2" range, however, hydraulic pressure is supplied to the manual valve 49 by means of the shift valve 55, so that the hydraulic pressure to the clutch C2 is cut irrespective of the movement of the solenoid valve 31 for controlling the clutch C2.

With respect to the brake B0, if the solenoid valve 32 for controlling the brake B0 is opened, the needle of the manual valve 50 moves and no hydraulic pressure is applied to the brake B0, thereby releasing the brake B0. If the solenoid valve 32 for controlling the brake B0 is closed, hydraulic pressure is applied to the brake B0, thereby causing the brake B0 to be engaged. Incidentally, while the clutch C0 is in operation, hydraulic pressure is applied to the manual valve 51 for controlling the brake B0, so that the brake B0 is forcedly released.

With respect to the brake B1, if the solenoid valve 33 for controlling the brake B1 is opened, the needle of the manual valve 51 moves, so that hydraulic pressure ceases to be applied to the brake B1, thereby releasing the brake B1. If the solenoid valve 33 for controlling the brake B1 is closed, hydraulic pressure is applied to the brake B1, thereby causing the brake B1 to be engaged. Incidentally, while the clutch C1 is in operation, hydraulic pressure is applied to the manual valve 50 for controlling the brake B1, so that the brake B1 is forcedly released.

With respect to the brake B2, if the solenoid valve 34 for controlling the brake B2 is opened, the needle of the manual valve 53 moves, so that hydraulic pressure ceases to be applied to the brake B2, thereby releasing the brake B2. If the solenoid valves 34 for controlling the brake B2 is closed, hydraulic pressure is applied to the brake B2 via the valve 52, thereby causing the brake B2 to be engaged. In the case of the "R" or "L" range, however, if the solenoid valve 35 for prohibiting reverse is set to on, hydraulic pressure is applied to the valve 52, and the supply of hydraulic pressure to the brake B2 is thereby cut, thereby releasing the brake B2.

The second regulator valve 44 generates secondary hydraulic pressure to a fluid pressure 58b in correspondence with the line pressure and the output pressure of the throttle valve 43. The secondary hydraulic pressure is delivered to a lock-up relay valve 45. The lock-up relay valve 45 is controlled by the solenoid valve 36 for controlling the lock-up relay. The solenoid valve 36 for the lock-up relay is a normally open solenoid valve and allows connection between the fluid passage 58b and a fluid passage 58c and between a fluid passage 58d and a fluid passage 58e during an "off" period, while it allows communication between the fluid passage 58b and the fluid passage 58d during an "on" period. The fluid passage 58c is connected to a working chamber of the torque converter 59. The fluid passage 58d allows connection between the torque converter 59 and the lock-up relay valve 45. The fluid passage 58e is for delivering the fluid from the lock-up relay valve 45 to a cooler 39. The solenoid valve 37 for controlling the lock-up duty is a normally closed solenoid valve, and is subjected to duty control. When the solenoid valve 37 for controlling the lock-up duty is off, the lock-up control valve 46 cuts off connection between the fluid passage 58c and a drain 46a. When the solenoid valve 37 for controlling the lock-up duty is subjected to duty control, an orifice between the fluid passage 58c and the drain 46a is controlled in correspondence with that duty ratio, or the flow rate of the fluid discharged from the fluid passage 58c to the drain 46a is controlled. When the fluid flows through the fluid passage 58d to the fluid passage 58c, the lock-up clutch 47 is operated, which in turn allows the output shaft of the engine and the turbine shaft 60 to be directly coupled with each other, thereby establishing a lock-up state.

By virtue of the above-described arrangement, if the solenoid valve 37 for controlling the lock-up duty is off (duty ratio: 0%) and the solenoid valve 36 for the lock-up relay is off, the secondary fluid is supplied to the working chamber of the torque converter 59 through the fluid passage 58c and is delivered to the cooler 39 via the fluid passage 58d and the fluid passage 58e. In this case, the lock-up clutch is off. When the solenoid valve 36 for the lock-up relay is turned on, the secondary fluid is supplied to the torque converter 59 via the fluid passage 58d. At this time, if the solenoid valve 37 for controlling the lock-up duty is engaged by 100%, the lock-up clutch 47 is engaged. If the solenoid valve 37 for controlling the lock-up duty is subjected to duty control, the fluid in the working chamber of the torque converter 59 is discharged to the drain in correspondence with a duty value, so that it is possible to change the state of engagement of the lock-up clutch 47. If the duty ratio of the solenoid valve 37 for controlling the lock-up duty is increased, the amount of fluid discharged to the drain becomes smaller, and the internal pressure of the working chamber of the torque converter 59 increases, thereby increasing the engagement ratio of the lock-up clutch 47. If the duty ratio of the solenoid valve 37 for controlling the lock-up duty is decreased, the amount of fluid discharged to the drain increases, so that the internal pressure of the working chamber of the torque converter 59 is lowered, and the lock-up clutch 47 is therefore made easy to slip.

The solenoid 38 and the solenoid valves 30 to 37 are driven by an electronic control circuit which will be described later, and the clutches and brakes are controlled so as to be in the relationships shown in Table 1 in correspondence with the running conditions.

Figure 3:
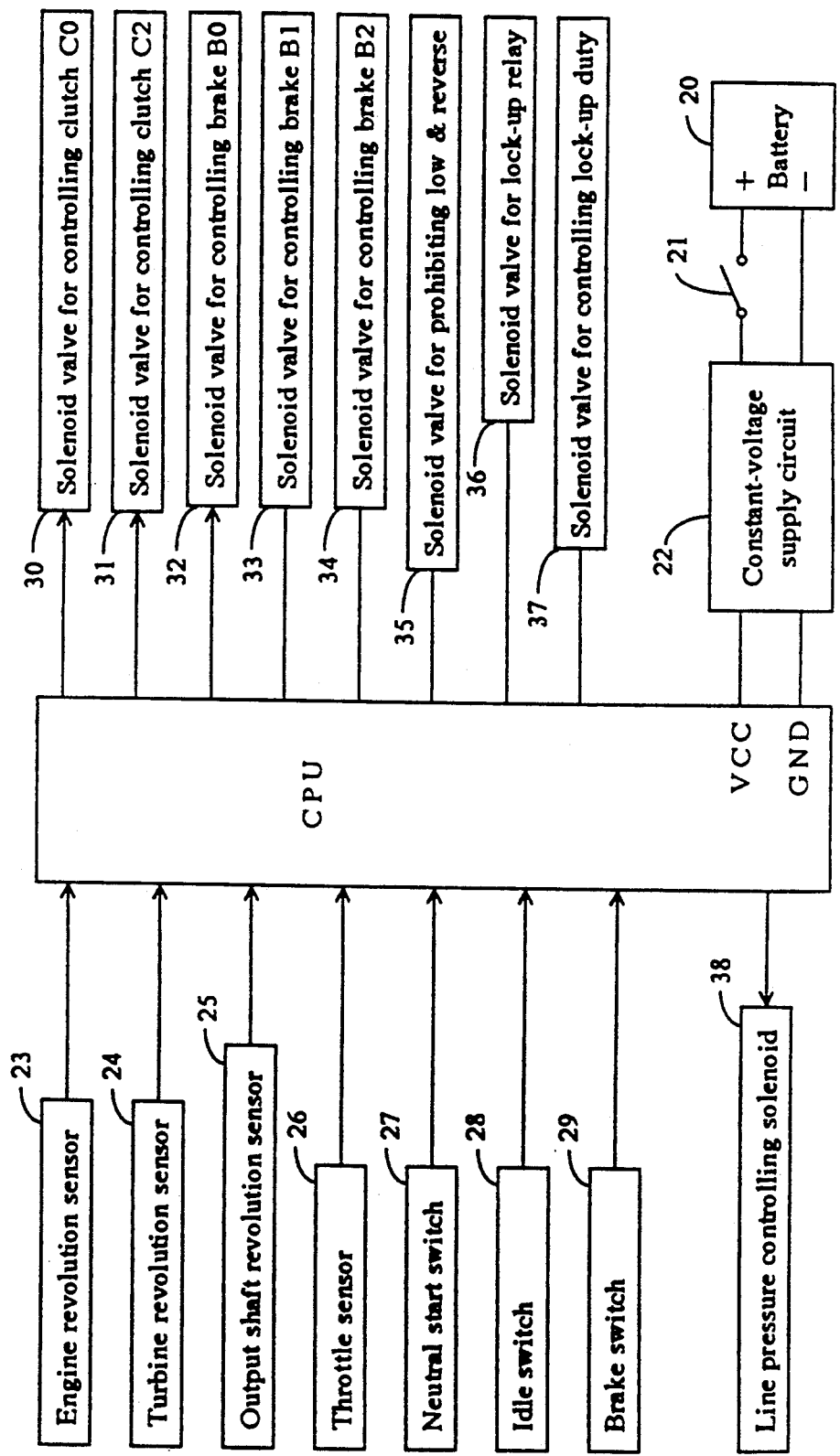
FIG. 3 is a diagram of an electronic control circuit for controlling the hydraulic circuit shown in FIG. 2.

FIG. 3 illustrates an electronic control circuit for driving the respective solenoid valves disposed in the hydraulic circuit.

An input terminal of a constant-voltage supply 22 is connected via an ignition switch 21 to a terminal of a battery 20 mounted on the vehicle. Connected to an output terminal of the constant-voltage supply 22 are a supply terminal VCC and GND of a central processing unit CPU. The constant-voltage supply 22 is used to convert an output voltage of the battery 20 into a voltage capable of rendering the central processing unit CPU operative.

Connected respectively to input terminals of the central processing unit CPU are an engine revolution sensor 23, a turbine revolution sensor 24, an output shaft revolution sensor 25, a throttle sensor 26, a neutral start switch 27, an idle switch 28, and a brake switch 29. In FIG. 3, input interfaces for the respective sensors and switches are omitted for the sake of simplicity.

The engine revolution sensor 23 is for detecting the engine speed of the vehicle. Since an output shaft of the engine is the same as an input shaft of the torque converter, this sensor also serves as a means for detecting the number of revolutions of the input shaft of the torque converter. The engine revolution sensor is disposed in the vicinity of the output shaft of the engine and outputs a pulse signal having a frequency corresponding to the engine speed. In this embodiment, the engine revolution sensor is a revolution sensor of an electromagnetic pickup type which is disposed in face-to-face relationship with the teeth of a ring gear attached to the output shaft of the engine, and outputs 120 pulses per revolution of the ring gear. This output is transmitted to the central processing unit CPU.

The turbine revolution sensor 24 is a revolution sensor for detecting the number of revolutions of the turbine. Since a turbine shaft is the same as the output shaft of the torque converter, this sensor also serves as a means for detecting the number of revolutions of the output shaft of the torque converter. The turbine revolution sensor is disposed in the vicinity of a rotational shaft of the turbine, and outputs a pulse signal having a frequency corresponding to the number of revolutions of the turbine. In this embodiment, the turbine revolution sensor is a revolution sensor of the electromagnetic pickup type which is disposed in face-to-face relationship with the teeth of a gear attached to the turbine shaft 60, and outputs 57 pulses per revolution of the gear. This output is transmitted to the central processing unit CPU.

The output shaft revolution sensor 25 of the transmission is a sensor for detecting the number of revolutions of an output shaft of the automatic transmission. The output shaft revolution sensor is disposed in the vicinity of the output shaft of the automatic transmission, and outputs a pulse signal having a frequency corresponding to the number of revolutions of the output shaft of the automatic transmission. In this embodiment, this sensor is a revolution sensor of the electromagnetic pickup type which is disposed in face-to-face relationship with the teeth of the gear attached to the output shaft, and outputs 18 pulses per revolution of the gear. This output is transmitted to the central processing unit CPU. It should be noted that the output shaft revolution sensor in this embodiment is for measuring the vehicle speed. The vehicle speed can be calculated if the relationship between the number of revolutions of the output shaft of the automatic transmission and the number of revolutions of the wheels as well as the radius of the wheel are known. Another type of vehicle speed sensor for detecting the vehicle speed may be used instead of the output shaft revolution sensor 25.

The throttle sensor 26 is a sensor for detecting an opening of a throttle valve of the engine. Among throttle sensors, there are a digital type in which an angle of rotation of the throttle valve is detected by a switch and a throttle valve opening is divided, an analog type in which the opening of a throttle valve opening is divided by using a mechanical-type throttle sensor and an A/D converter after converting an angle of rotation of the throttle valve into a voltage value, and an electric-type throttle sensor. In the present invention, two types of throttle sensors are provided and used by being changed over. In an ordinary apparatus, either one type of the throttle sensors may be used. The throttle sensor outputs from a signal line a signal in which the opening of the throttle valve is divided into eight equal parts. It is assumed that a fully closed state of the throttle sensor is $\theta 0$, and a fully open state $\theta 7$ thereof.

The neutral start switch 27 is used to detect the position of the shift lever and is provided with a "D" (drive) range switch, an "L" (low) range switch, a "2" (second) range switch, a "3" (third) range switch, an "N" (neutral) range switch, an "R" (reverse) range switch, and a "P" (parking) range switch so as to detect the respective ranges of "D", "L", "2", "3", "N", "R", and "P".

The idle switch 28 is used for detecting an idle state of the vehicle, and in this embodiment it is provided on an accelerator pedal. A switch which responds when the accelerator pedal is not being pressed down is used as this switch. This switch may be substituted by one which detects the idle state in correspondence with the opening of the throttle valve, the pressure of an intake manifold, or the like.

The brake switch 29 is used to detect a braking state of the vehicle. This switch may be one which is provided on the brake pedal, or may be one adapted to detect the deceleration of the vehicle.

Connected to output terminals of the central processing unit CPU are the solenoid valve 30 for controlling the clutch C0, solenoid valve 31 for controlling the clutch C2, solenoid valve 32 for controlling the brake B0, solenoid valve 33 for controlling the brake B1, solenoid valve 34 for controlling the brake B2, solenoid valve 35 for prohibiting low and reverse, solenoid valve 36 for the lock-up relay, solenoid valve 37 for controlling the lock-up duty, and solenoid valve 38 for controlling the line pressure. In FIG. 3, output interfaces and driving devices for the respective solenoids are omitted for the sake of simplicity.

The solenoid valves are respectively controlled by the central processing unit CPU. The central processing unit CPU incorporates memories, such as a RAM and a ROM, a timer, and a register. When the ignition switch is turned on, a voltage begins to be supplied to the central processing unit CPU via the constant-voltage circuit 22. Upon application of the voltage to the central processing unit CPU, the central processing unit CPU begins to execute processing according to the main routine shown in FIG. 4.

Figure 4:
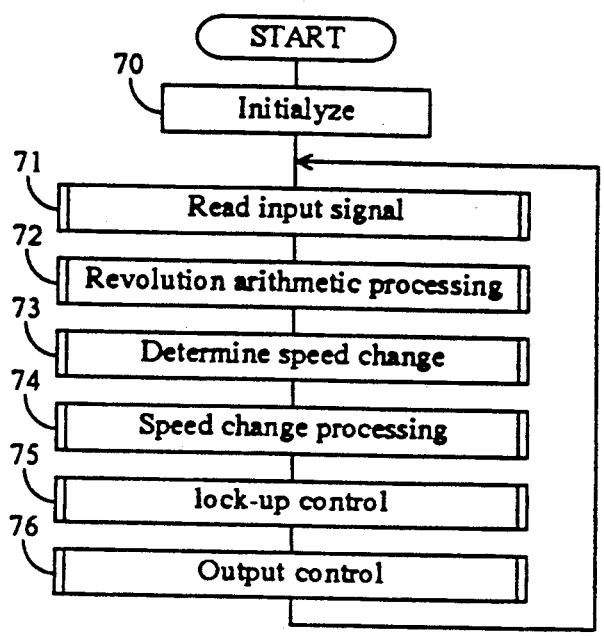
FIG. 4 is a flowchart of a main routine of a CPU of the electronic control circuit shown in FIG. 3.

A description will be given hereinunder of a flowchart of the main routine of the central processing unit CPU shown in FIG. 4.

Main Routine

Upon starting of the central processing unit CPU, the setting of input/output directions of input/output ports, the initialization of each memory, the setting of the presence or absence of interrupt, etc. are first executed (Step 70). Subsequently, an input/output read routine is executed, and the reading of states of the sensors and switches connected to the input terminals, removal of noise, and the setting of data in correspondence with the stats of the sensors and switches are carried out (Step 71).

Then, a revolution arithmetic processing routine is executed to calculate the vehicle speed, the number of revolutions of the turbine, and the engine speed (Step 72).

The calculation of the engine speed NE is effected according to the formulae given below. Incidentally, a calculation is made by dividing an output from the engine revolution sensor into eight sine it is a high frequency.

$$NE = [nE\,(i-1) + nEi]/2$$

$$nEi = (P\,CEi/T\,Ei) \times \text{(divided by eight}/8 \times 10^{-6}) \times (60/120)$$

where
  $nEi$: engine speed based on the current pulse
  $TEi$: counted time up to an edge of the first pulse exceeding 10 ms from the previous pulse
  $P\,CEi$: number of pulses in $TEi$
  : minimum unit of detection time (8 $\mu$s).

The calculation of the turbine revolution NT is effected according to the formulae given below. Incidentally, a calculation is made by dividing an output from the turbine revolution sensor into four sine it is a high frequency.

$$NT = [nT\,(i-1) + nTi]/2$$

$$nTi = (P\,CTi/T\,Ti) \times \text{(divided into four}/8 \times 10^{-6}) \times (60/57)$$

where
  $nTi$: turbine revolution based on the current pulse
  $T\,Ti$: counted time up to an edge of the first pulse exceeding 10 ms from the previous pulse
  $P\,CTi$: number of pulses in $T\,Ti$ The calculation of the output shaft revolution N0 is effected according to the formulae given below.

$$N0 = [n0\,(i-1) + n0\mathrm{l}]/2$$

$$n0\mathrm{l} = (P\,C0i/T0i) \times (1/8 \times 10^{-6}) \times (60/18)$$

where
  $n0\mathrm{l}$: output shaft revolution based on the current pulse
  $T\,0i$ = counted time up to an edge of the first pulse exceeding 10 ms from the previous pulse
  $P\,C0i$: number of pulses in $T\,0i$ Since a gear ratio between the output shaft and the axle and the radius of the wheel can be known in advance, the vehicle speed can be determined from the output shaft revolution N0.

After the revolution arithmetic processing routine, a speed-change determination routine is executed to determine a speed change (Step 73). In the speed-change determination routine, the setting of the line pressure is also effected. A line pressure setting is determined on the basis of a throttle opening and a number of revolutions of the turbine. The line pressure solenoid is duty driven according to this setting. In this routine, the presence or absence of a speed-change determination is made on the basis of the throttle opening, vehicle speed, and a speed-change diagram prepared in advance in the current shift stage. Then, a speed-change processing routine is executed to effect speed-change processing (Step 74). In this step, when a speed-change determination has been made, disengagement-side solenoid valves and engagement-side solenoid valves are set. Then, a lock-up control routine is executed to effect lock-up processing (Step 75). Finally, an output control routine is executed to effect output control (Step 76). In output control, selection of power-on upshift, power-off upshift, and downshift at the start of speed change, a determination of a speed-change state during speed change, and signal output to solenoid valves are carried out. It should be noted that the power-on upshift means upshift in cases where the driving torque of the engine is high, while the power-off upshift means upshift in cases where the driving torque of the engine is low. Since fluctuations of the torque of the output shaft of the automatic transmission become large depending on the state of the driving torque of the engine, an attempt is made to reduce a shock by varying the control time.

Interrupt Routine

Outputs of the output shaft revolution sensor, turbine revolution sensor, and engine revolution sensor are respectively connected to interrupt input terminals of the central processing unit CPU. Each time the voltage levels of the interrupt terminals change, an output shaft revolution sensor interrupt routine, a turbine revolution sensor interrupt routine, and an engine revolution sensor interrupt routine are executed, although not shown. In the output shaft revolution sensor interrupt routine, the time of interrupt is first read by a timer, whereupon an operation flag for calculating the output shaft revolution is set to on. Accordingly, by referring to the read time when the operation flag is on in the main routine or subroutine, the number of revolutions of the output shaft can be calculated. In the turbine revolution sensor interrupt routine, the time of interrupt is first read by the timer. At this juncture, when the interrupt has been counted four times in order to divide the input pulse into four, an operation flag for calculating the turbine revolution is set to on. In the engine revolution sensor interrupt routine, the time of interrupt is first read by the timer. At this juncture, when the interrupt has been counted eight times in order to divide the input pulse into eight, an operation flag for calculating the engine speed is set to on. The turbine revolution and the engine speed are also calculated in a manner similar to that of the output shaft revolution.

Figure 5:
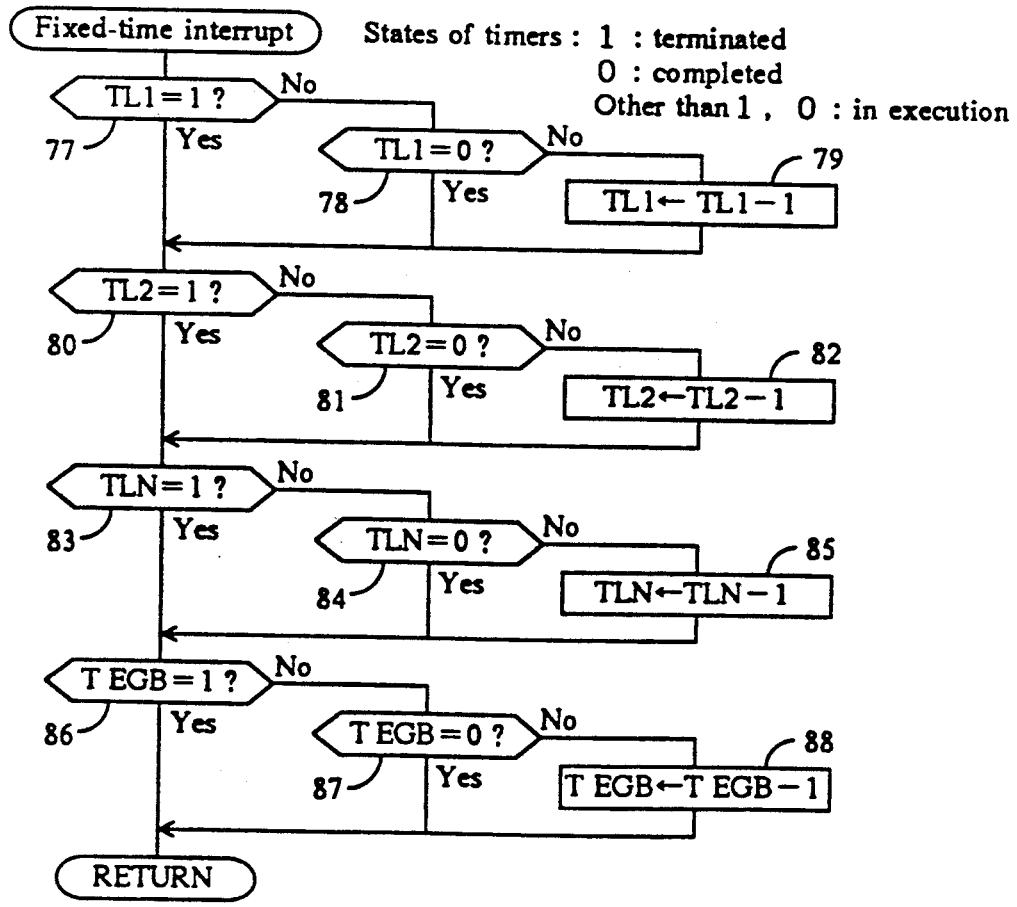
FIG. 5 is a flowchart of a fixed-time interrupt routine of the electronic control circuit shown in FIG. 3.

As shown in FIG. 5, the central processing unit CPU has a fixed-time interrupt function which takes place after the lapse of each fixed time. In this embodiment, a fixed-time interrupt routine is executed at each 4 ms. In this routine, subtraction is first carried out for various timers used in control. Timers for which subtraction is carried out include, in addition to the timer for speed change, three timers T L1, T L2, T LN for lock-up control, and a timer T EGB for engine brake control. If an arbitrary value exceeding 1 is set for the respective timers for lock-up control during execution of the main routine or subroutine, subtraction is effected by 1 each time the fixed-time interrupt routine is executed. However, if the value is 1, 1 is retained. Accordingly, when the time equivalent to the value initially set to the timers elapses, the value of the timers become 1, so that it can be understood that the timers have timed up. If 0 is set during the main routine or subroutine, the timers retain 0 even if interrupt is attempted. As will be described later, 0 is set to the timers after confirmation is made in the main routine or subroutine that the values of the timers have become 1. Accordingly, it can be understood that the timers are in operation if the values of the timers are 2 or more, that the timers have timed up if they are 1, and that the operation of the timers has already been completed if they are 0. The timer T EGB for engine brake control is substantially similar to the timers for lock-up control but differs in that 0 is not substituted immediately after completion of the timer. This timer means that engine brake control is possible when its value is 1.

Although not shown, a determination of a vehicle stop is effected in this fixed-time interrupt routine. In his embodiment, it is assumed that the vehicle stop takes place at a vehicle stop speed N stop = 144 rpm (approx. 3 km) or less. In addition, it is also assumed that the vehicle stop also takes place when no pulse is supplied to the central control unit CPU for an input frequency T stop = 23.13 ms or more.

Lock-up Control

Figure 6:
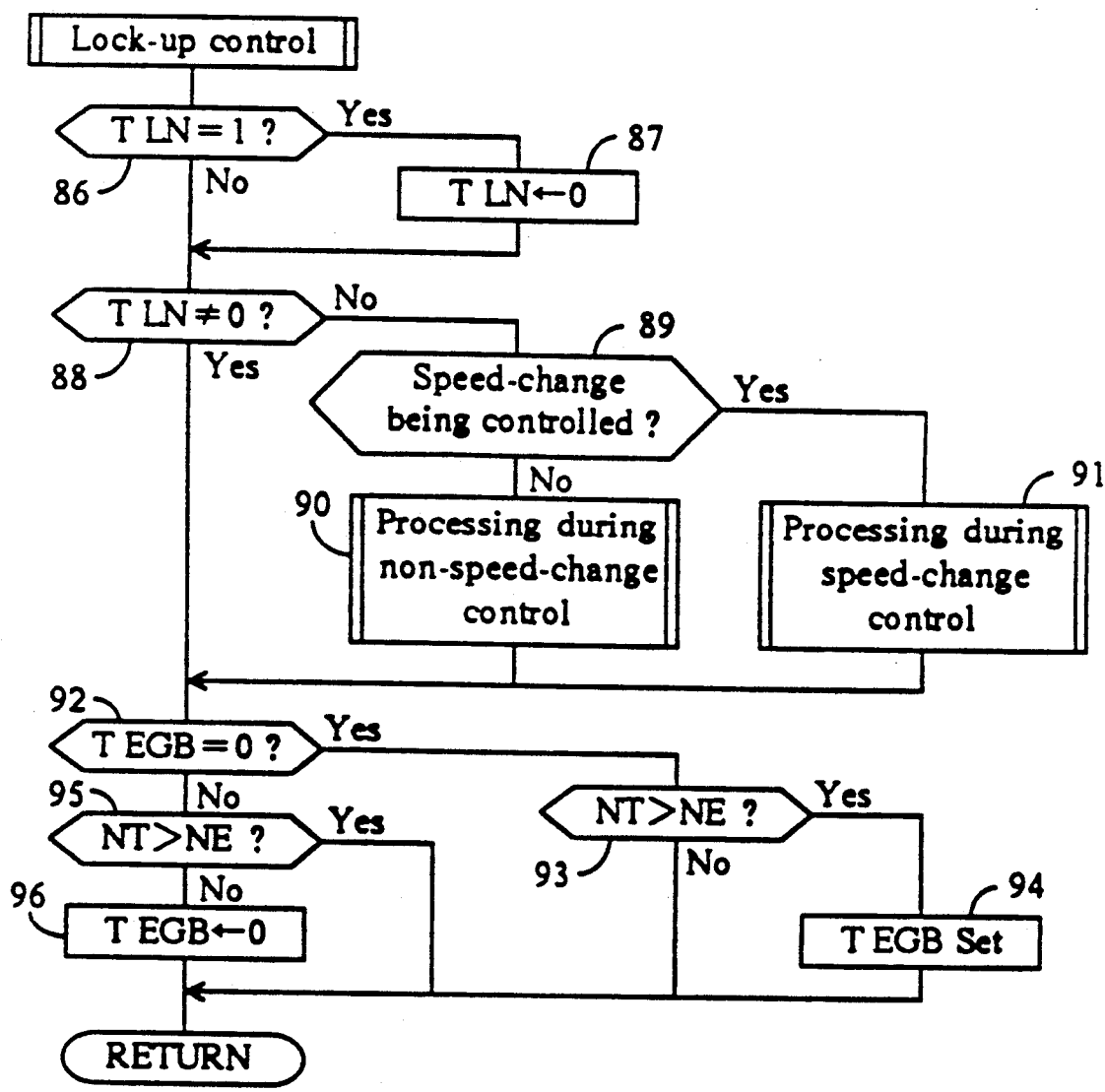
FIG. 6 is a detailed flowchart of a lock-up control routine shown in FIG. 3.

FIG. 6 is a flowchart of a lock-up control routine.

Timers used in this control include four timers, T L1, T L2, T LN, and T EGB. As shown in FIG. 16b, the timer T L1 is used for fixing the duty ratio as it is at 0% for a predetermined time from the time when a lock-up "on" determination is made. As shown in FIG. 16b, the timer T L2 is a timer used for fixing the duty ratio of the lock-up clutch to 25% for a predetermined time upon completion of the timer T L1. The timer T LN is used to prohibit ensuing lock-up control for a predetermined time after the lock-up clutch has been set to on. The timer T EGB is used for preventing the hunting of engine brake control, which will be described later.

In addition, flags used for this control include a speed-change control "on" flag F LD and an engine brake control "on" flag F EGB. The speed-change control "on" flag F LD is set when the lock-up clutch is controlled during a speed change. The engine brake control "on" flag F EGB is set when engine brake control is effected.

Furthermore, a counter C SD is used during this control. The counter C SD assumes a value from 0 to 5. The value of the counter C SD indicates in which region of the lock-up diagram shown in FIG. 15, which will be described later, a current duty value is located. When the duty value is in region 0, the value of the counter C SD is set to 0; when in region 1, it is set to 1; when in region 2, it is set to 2; when in region 3, it is set to 3; and when in region 4, it is set to 4. However, once the value o the counter C SD is set to 4, the value of the counter C SD is kept at 4 until the duty value enters region 0. Once the value of the counter C SD is set to 0, the value of the counter C SD remains at 4 until the duty value moves into region 1, 2, 3 or 4.

Referring now to FIG. 6, when the lock-up control routine is executed, a determination is first made as to whether or not the timer T LN has been terminated (T LN = 1), and, if not, the timer T LN is completed (T LN←0) (Steps 86, 87).

Then, if the timer T LN has not been completed, lock-up control is skipped, and the operation returns to the main routine. When the timer T LN has been completed, a routine for processing during non-speed-change control or a routine for processing during speed-change control is selected depending on whether speed change is presently being effected (Steps 88 91).

Subsequently, timer processing for preventing the hunting of engine brake control is effected (Steps 92–97). If the turbine revolution N T exceeds the engine speed N E upon completion of the timer T EGB (T EGB = 0), a predetermined value (e.g., 0.1 sec.) is set to the timer T EGB so as to start the timer T EGB. Upon termination of the timer T EGB (T EGB = 1) or if the turbine revolution N T exceeds the engine speed N E, the timer T EGB is completed.

Processing During Non-speed Change Control

Figure 7:
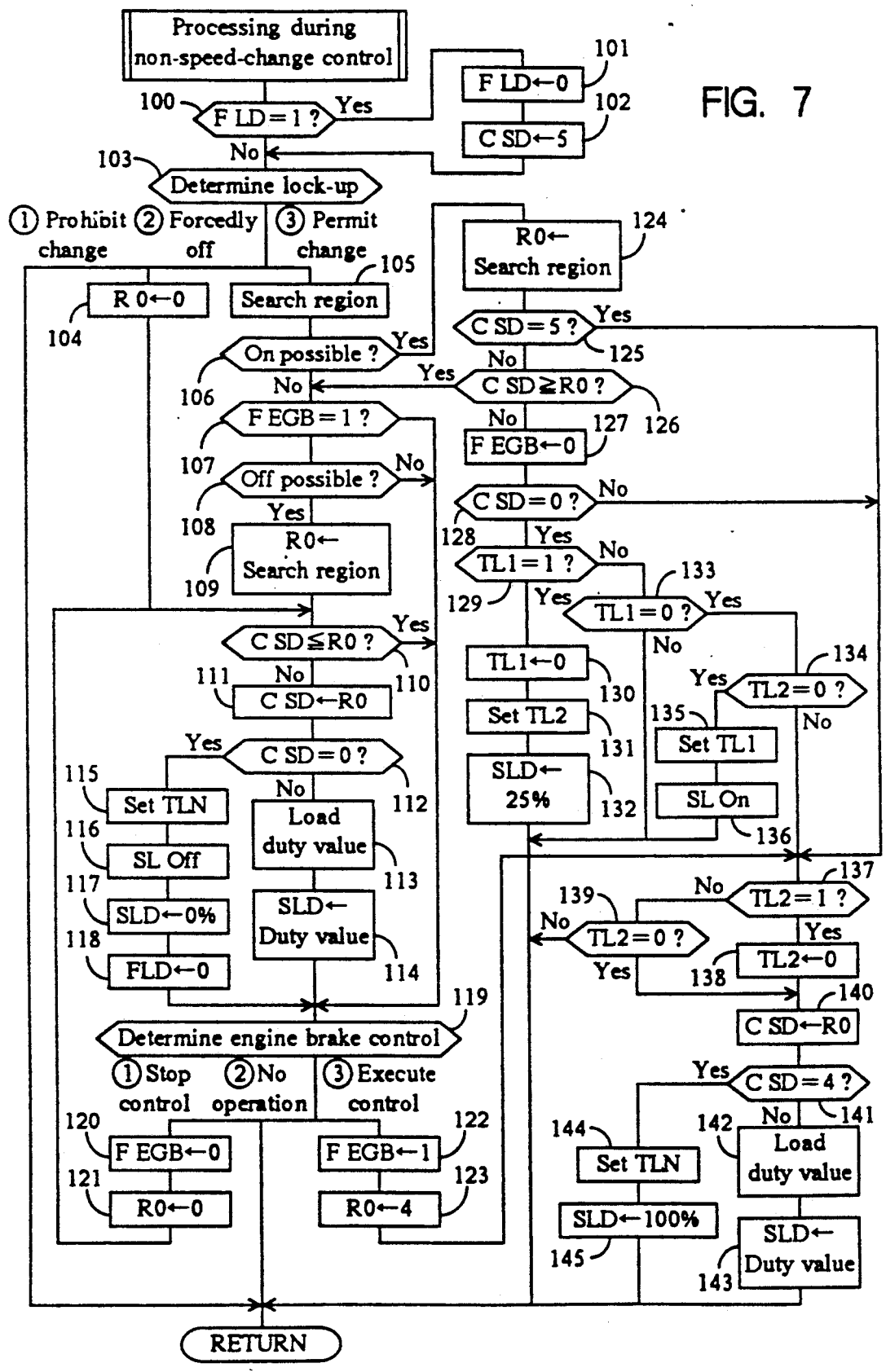
FIGS. 7 and 8 are detailed flowcharts of a routine for processing during non-speed-change control and a routine for speed-change control shown in FIG. 6, respectively.

In cases where the automatic transmission of the vehicle is not undergoing a change in the speed change gear, processing is executed in accordance with the flowchart shown in FIG. 7.

First, as processing immediately following speed-change control, in cases where the flag F LD (which is set when lock-up control is effected in processing during speed-change control, which will be described later) is up, the flag F LD is cleared, and the counter C SD is set to 5 (Steps 100–102).

Then, a determination is made as to whether or not lock-up can be effected (Step 103). The detail of this determination is shown in FIG. 9. In the flowchart of FIG. 9, any one of the three possible choices, prohibition of lock-up change, a lock-up forced "off", and permission of lock-up change, is determined, as shown in the table in FIG. 11. When the counter C SD is 0 at the time of 1st or in the "P", "R", "N", or "L" range, the lock-up is already "off", so that in this case the change of lock-up is prohibited. In addition, in the "2" range, 0/D is prohibited, so that the lock-up is set to off in this case as well.

Referring again to FIG. 7, if a determination is made that the change of lock-up is prohibited, the operation returns to the lock-up control routine of FIG. 6 without effecting any processing. Accordingly, the state of lock-up remains in the same state.

Figure 14:
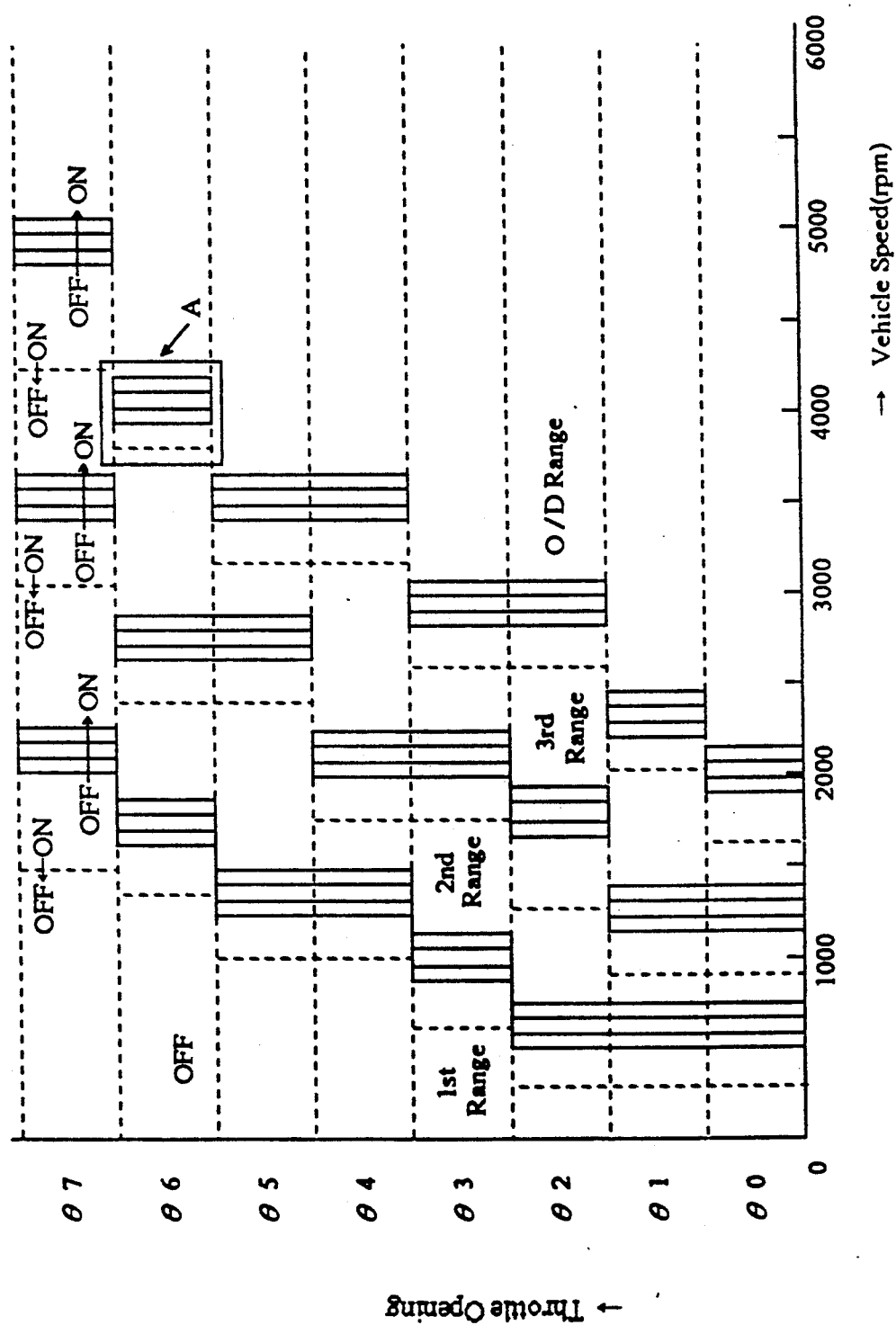
FIGS. 14 and 15 are lock-up diagrams in accordance with the embodiment.
Figure 15:
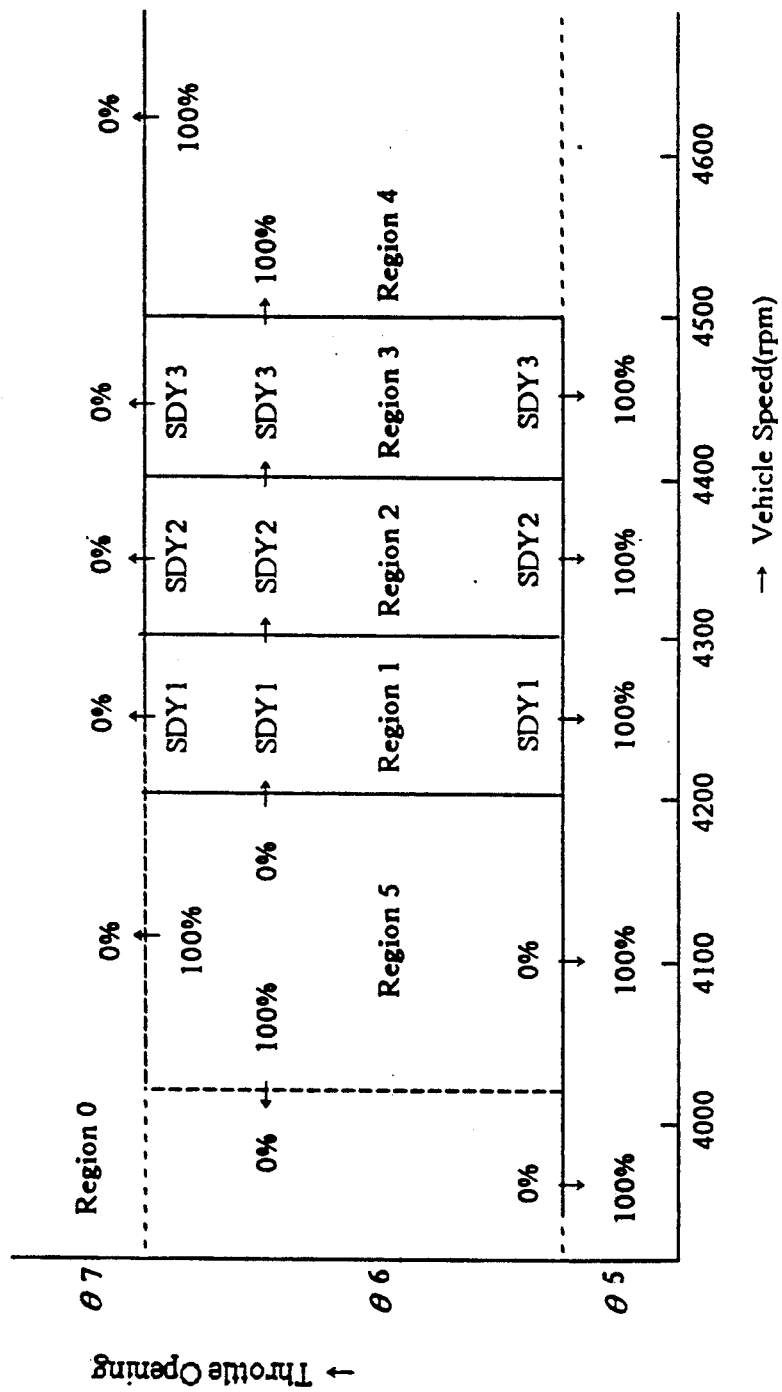

If it is determined in the lock-up determination that the change of lock-up is permitted, a determination of the current region is effected on the basis of the throttle opening. The diagram of this embodiment is shown in FIG. 14. FIG. 14 illustrates the lock-up diagram of the "D" range, and similar lock-up diagrams are set for the other ranges as well. Part A of FIG. 14 is shown in FIG. 15 in enlarged form. The lock-up diagram consists of a region with a 1% duty SDY, a region 2 with a 2% SDY, a region 3 with a 3% duty SDY, a region 4 with a 100% duty, a region 5 which is a hysteresis range from "on" to "off" and from "off" to "on", and a region 0 in which the duty completely becomes 0% (off). SDY 1 to 3 are respectively set in correspondence with a current shift stage, as shown in the table in FIG. 12. In the determination of a region, a determination is made as to in what region of the regions 0–5 the current vehicle speed is located. Stored in the central processing unit CPU is vehicle speed data at the time of a changeover in duty with respect to the ranges, shift, and throttle opening shown in FIG. 13, and a region is determined through a comparison between the current vehicle speed and the vehicle speed data. After determination of the region, if the lock-up clutch is in any of the regions 1-4, a determination is made that the clock-up clutch can be set to on. If the lock-up clutch can be set to on, the number of a searched region is substituted into a variable R0 (Step 124). If the counter C SD is 5, it is immediately after speed-change processing, so that lock-up "on" control of Steps 137 145 is executed (Step 125). If the counter C SD is not less than the variable R0, the current duty ratio is greater than the duty ratio to which a change is to be made, so that lock-up "on" processing is not effected, and the operation jumps to processing for lock-up "off" in and after Step 107 (Step 126). If the counter C SD is smaller than the variable R0, the lock-up can be changed to a greater duty ratio. At this time, after the F EGB for engine brake control is cleared, if the counter C SD is 0, Steps 129 through 136 for preliminary control of lock-up are executed, while if the counter C SD is other than 0, lock-up "on" control in Steps 137 145 is executed (Step 127-128).

In the preliminary control of lock-up, both the timers T L1 and T L2 should be 0 at the time of control start, so that the timer T L1 is first set, and a flag SL for the output of the solenoid valve 36 for the lock-up relay is set to on. It should be noted that, if this flag is on, the solenoid valve 36 for the lock-up relay is controlled to be on in an output control routine. While this timer T L1 is being executed, processing is slipped. Upon completion of the timer T L1 (T L1=1), after the timer T L1 is set to 0, the T L2 is set, and 25% is set to a variable SLD for an output of the solenoid valve 37 for controlling the lock-up duty. Incidentally, in the output control routine, the solenoid valve 37 for controlling the lock-up duty is subjected to duty control by a value substituted into the variable SLD.

In the lock-up "on" control (Steps 137–145), processing is not effected until the timer TL2 terminates. Upon termination of the timer TL2, 0 is substituted into the timer TL2 to complete the timer TL2. When the timer TL2 has been completed or terminated, the variable R0 which denotes a region to be changed is substituted into the counter C SD. If the substituted value is other than 4, a duty value commensurate with the value of the counter C SD is loaded, and its duty value is substituted into the variable SLD. For instance, if the current shift stage is 3rd, and the value of the counter C SD is 2, the duty value SDY2=60% (see FIG. 12) for the third and the region 2 is read from the memory and is set in the variable SLD. If the substituted value is 4, the timer T LN is set to set the variable SLD to 100%, and the solenoid valve 37 for controlling the lock-up duty is completely set to on.

In processing for lock-up off in and after Step 107, if the flag F EGB for engine brake control is 1, lock-up "off" control in Steps 111-118 is skipped. If the flag F EGB is 1, processing for turning the lock-up on is effected in the engine brake control, which will be described later, so that lock-up "off" control is not carried out. If the flag F EGB is 0 and the region searched in Step 105 is 0, lock-up off is possible, so that the number of the region search, i.e., 0, is substituted into the variable R0 (Step 109). Subsequently, when the value of the variable R0 is greater than the counter C SD indicating the current region, processing for lowering the duty is not carried out and the lock-up "off" control is skipped (Step 110).

In the lock-up "off" control, if the value of the counter C SD is other than 0, the duty value is loaded so as to be set in the variable SLD (Steps 113, 114). This processing is not actually executed in this embodiment since there is no portion for setting the variable R0 to a value other than 0 prior to the lock-up "off" control. Accordingly, this processing may be deleted. When there is a need to temporarily fix the duty value to a predetermined value without immediately setting the lock-up to off when the lock-up is set to off, this step becomes effective. If the value of the counter C SD is 0, the timer T LN is set, the flag SL for an output of the solenoid valve 36 for the lock-up relay is set to off, the variable SLD is set to 0%, and the flag F LD indicating that lock-up control has been effected in processing during speed-change control is cleared.

In the lock-up determination described above, if it is determined that the lock-up has been forcedly set to off, this lock-up "off" control is carried out. Since the variable R0 is set to 0 in Step 104, if the lock-up "off" control is executed, the flag SL for an output of the solenoid valve 36 for controlling the lock-up relay is set to off, so that the variable SLD becomes 0%.

Figure 10:
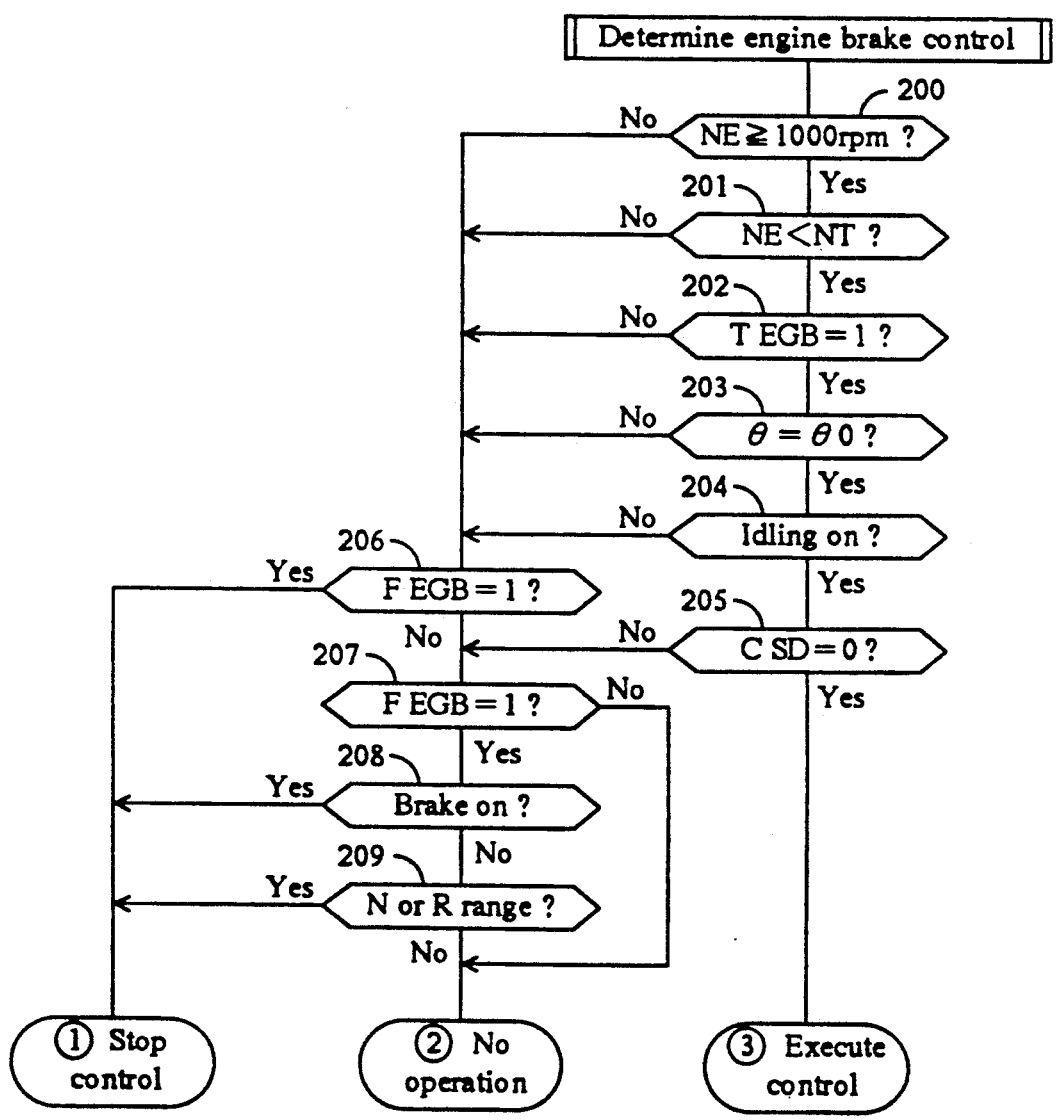

Subsequent to the lock-up "off" control, engine brake control is carried out. First, a determination is made as to whether or not engine brake control is possible. The detail of this determination is shown in FIG. 10. The engine brake control is executed when the counter C SD=0 (the current duty ratio of the solenoid valve is 0%) and when all of the following five conditions are met: (1) engine speed NE≧1,000 rpm, (2) engine speed NE<turbine revolution NT, (3) timer T EGB=1 (the formula: engine speed NE<turbine revolution NT" continues for the time T EGB or more), (4) throttle opening $\theta = \theta 0$, and (5) the idle switch is on (the accelerator pedal is not being pressed down). At this juncture, the flag F EGB is set, and 4 is substituted into the variable R0 before the lock-up "on" control is executed. Accordingly, Steps 144 and 145 are executed, and the solenoid valve 37 for controlling the lock-up duty is completely set to on. If at least one of the five conditions (1) to (5) fails to be met during the execution of the engine brake control (F EGB=1), a determination for stopping the control is made. Hence, the flag F EGB is cleared, and 0 is substituted into the variable R0 before the lock-up "off" control is executed. Accordingly, the solenoid valve 37 for controlling the lock. up duty is completely set to off in Steps 116, 117. Even if all the five conditions (1)–(5) mentioned above are met during execution of the engine brake control, unless the current lock-up state is off (counter C SD=0), a determination for stopping the control is made if at least one of the conditions of brake "on", "N" range or "R" range holds. In the cases, control is not carried out.

Processing During Speed-Change Control

Figure 8:
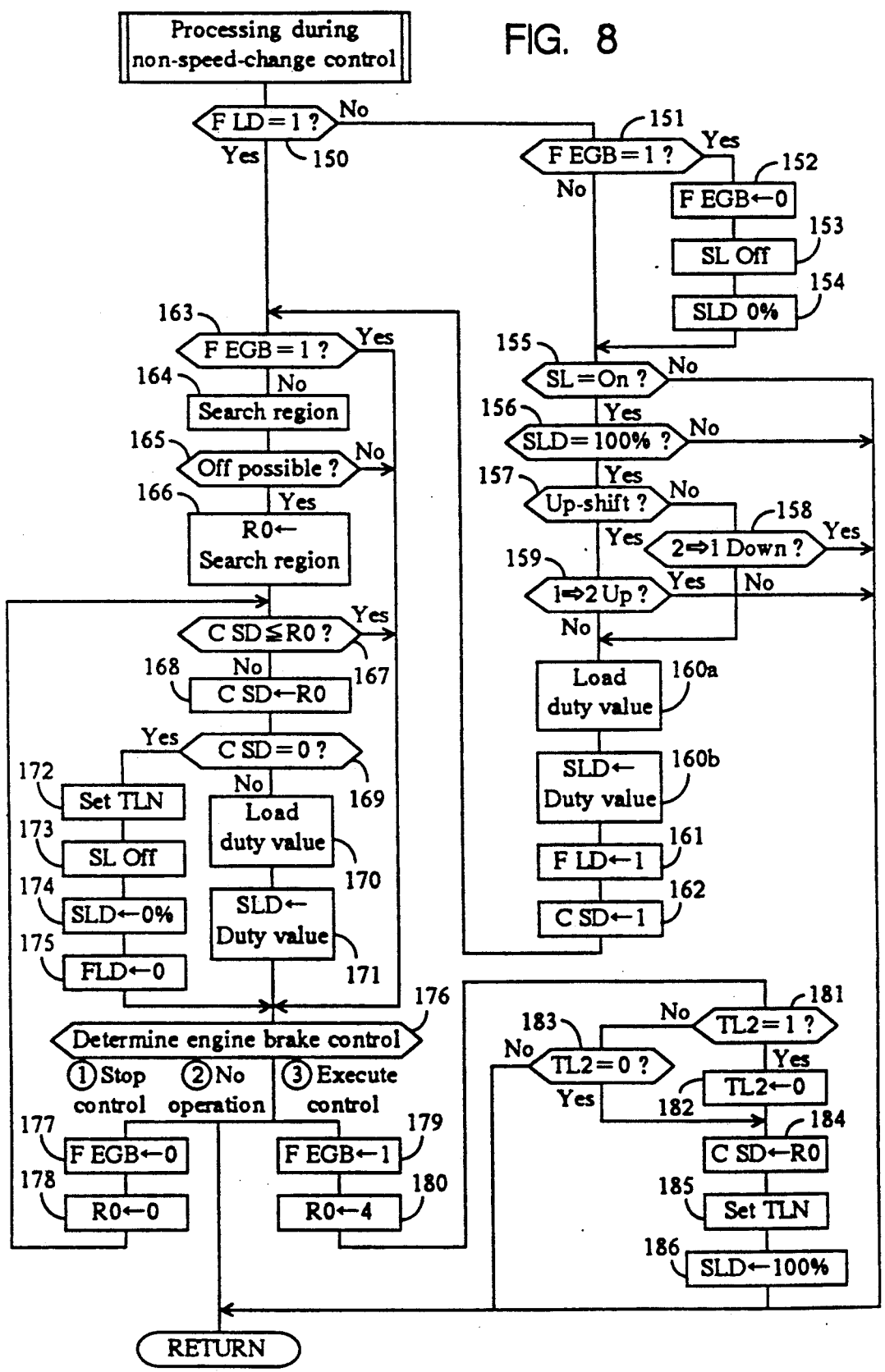

In a case where the automatic transmission of the vehicle is undergoing a change in the speed-change gear, processing is effected in accordance with the flowchart shown in FIG. 8.

First, if the flag F LD is 0, and the engine brake control is not being executed (flag F EGB≠1), duty value hold control is executed (Steps 150, 151). If the flag F LD is 0, and the engine brake control is being executed, the flag F EGB is set to 0, the flag SL for an output of the solenoid valve 36 for the lock-up relay is set to off, and the variable SLD is set to 0% (Steps 152-154).

The duty value hold control is effected when the solenoid valve 36 for the lock-up relay is currently on (SL =on), and the solenoid valve 37 for controlling the lock-up duty is being engaged 100% (SLD=100%), and in cases other than when the shift lever is being upshifted to second speed or downshifted to first speed (Steps 155-159). In the duty value hold control, a duty value corresponding to the shift and the throttle opening is first set, and a duty value set in the variable SLD is substituted. Subsequently, the flag F LD is set, and the counter C SD is set to 1 (Steps 160-162). Incidentally, the setting of the duty value is carried out on the basis of the table shown in FIG. 17.

Upon execution of the duty value hold control, the flag F LD becomes 1, so that Step 163 and ensuing steps are executed after execution of the duty value hold control and during execution of ensuing processing during speed-change control. In Steps 164-175, lock-up "off" control is effected. In Step 164, a region is searched in the same way as Step 105 for Non-speed-change control processing (FIG. 7). Steps 165-175 are similar to Steps 108-118 for non-speed-change control processing (FIG. 7). If the lock-up can be set to off, the counter C SD is set to 0, the timer T LN is set, the flag SL for an output of the solenoid valve 36 for the lock-up relay is set to off, 0% is set to the variable SLD, and the flag F LD is cleared.

Steps 176-186 following these steps are similar to Steps 119-123 and Steps 137-145 in non-speed-change control processing (FIG. 7). A determination is made as to whether or not engine brake control is possible, and if YES is the answer, the flag F EGB is set, the variable R0 is set to 4, and after waiting for the timer T L2 to terminate, the value (4) of the variable R0 is set in the counter C SD, then the timer T LN is set, and the variable SLD is set to 100%.

Referring now to the timing charts of FIGS. 16a-16h and the lock-up diagram shown in FIG. 15, a description will be given of the lock-up control routine.

Figure 16A:
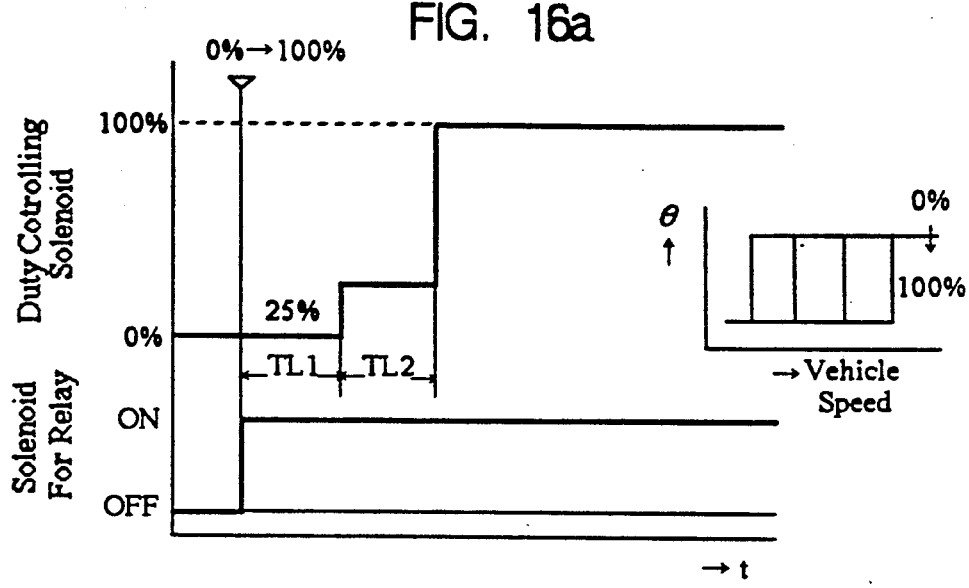
FIGS. 16a to 16h are timing charts illustrating the operation in accordance with the embodiment.
Figure 16B:
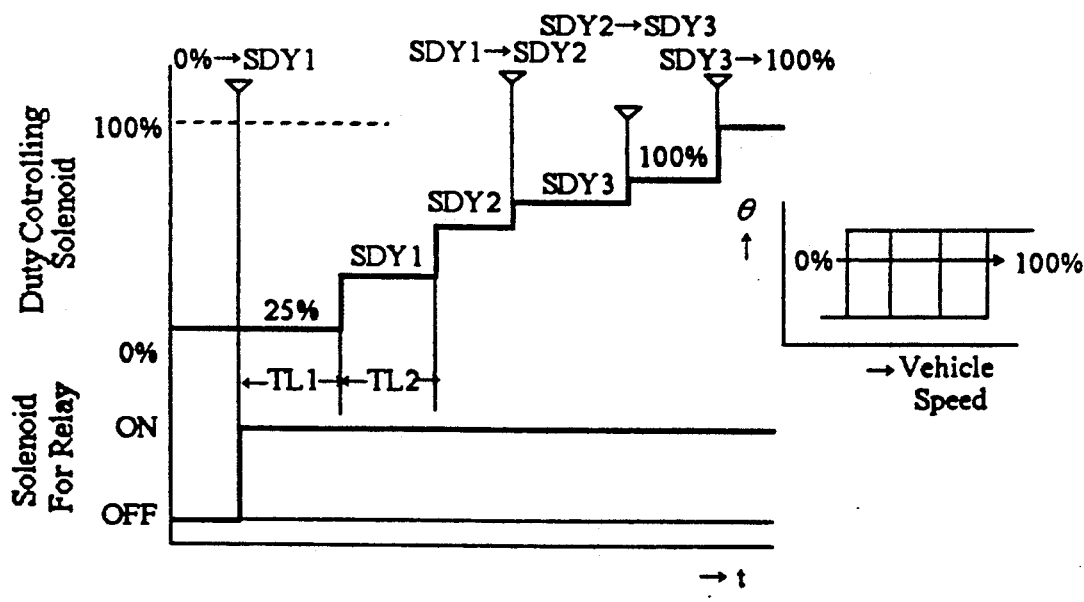
Figure 16C:
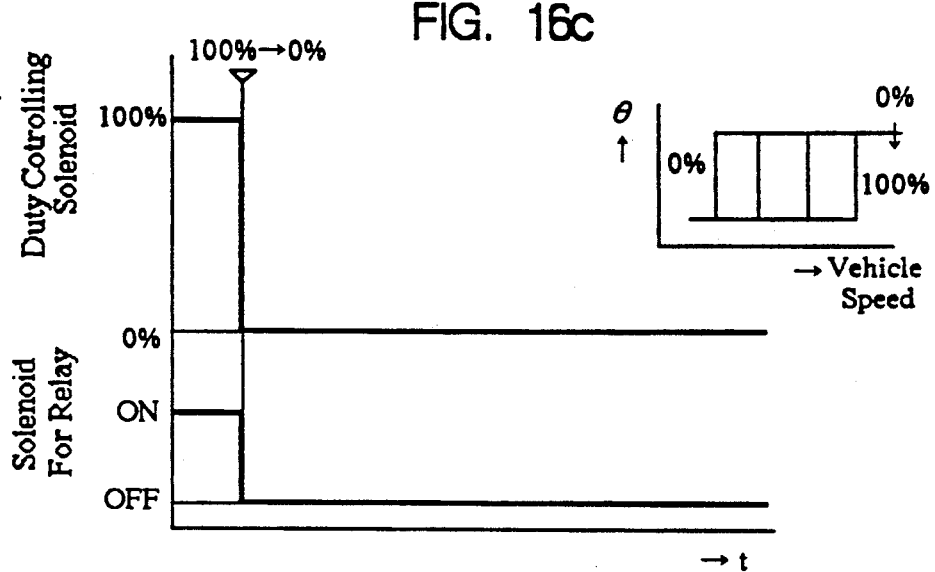

When a point corresponding to the throttle opening and the vehicle speed on the lock-up diagram during the non. speed-change control has entered the region 0 or from the region 5 to the region 4, processing is effected for changing the solenoid valve 37 for controlling the lock-up duty from 0% to 100% (see FIG. 16a). Since speed-change control is not being carried out, processing during non-speed-change control (FIG. 7) is executed. If the point enters the 100% region, the solenoid valve 36 for the lock up relay is first set to on. Subsequently, after the lapse of a time T L1 sec., the solenoid valve 37 for controlling the lock-up duty is engaged by 25%. The reason for allowing the start of engagement of the solenoid valve 37 for controlling lock-up duty to elapse for the time T L1 sec. is because it takes time until the internal hydraulic pressure of the working chamber in the torque converter becomes stabilized when the flow of the hydraulic pressure inside the lock-up relay valve 45 is changed over after the solenoid valve 36 for the lock-up relay is set to on. In other words, as the time T L1, it suffices if a time until the hydraulic pressure inside the working chamber after the solenoid valve 36 for the lock-up relay is set to on is determined. If the solenoid valve 37 for controlling the lock-up duty is engaged by 25%, hydraulic pressure is applied to the lock-up clutch in the torque converter. However, the lock-up clutch does not actually function as a clutch at 25%. In other words, this value of 25% is a preliminary one for enabling the lock-up clutch to operate instantaneously, and it is a value determined on the basis of an immediately preceding rate at which the lock-up clutch actually begins to function. After the lapse of the time T L2 sec., the solenoid valve 37 for controlling the lock-up duty is engaged by 100%.

When the point corresponding to the throttle opening and the vehicle speed on the lock-up diagram during non-speed-change control has entered the region 0 or from the region 5 to the region 4 via the regions 1, 2, 3, processing is effected for consecutively changing the duty ratio of the solenoid valve 37 for controlling the lock-up duty (see FIG. 16b). Since speed-change control is not being effected, processing during non-speed-change control (FIG. 7) is executed. When the point has entered the region 1, the solenoid valve 36 for the lock-up relay is set to on. Subsequently, after the lapse of the time T L1 sec. until the hydraulic pressure becomes stabilized, the solenoid valve 37 for controlling the lock-up duty is engaged by 25% in order to apply preliminary hydraulic pressure for the time T L2. The solenoid valve 37 for controlling the lock-up duty is then engaged by the duty value SDY1 set in accordance with FIG. 12. Subsequently, each time the point enters an ensuing region, the duty ratio of the solenoid valve 37 for controlling the lock-up duty is changed to a value corresponding to that region.

When the point corresponding to the throttle opening and the vehicle speed on the lock-up diagram during non-speed-change control has entered the region 0 from the region 4, processing is effected for changing the duty ratio of the solenoid valve 37 for controlling the lock-up duty to 0% (see FIG. 16). Since speed change control is not being carried out, processing during non-speed-change control (FIG. 7) is executed. In this case, when the point has entered the region 0, the solenoid valve 36 for the lock-up relay is immediately set to on, and the solenoid valve 37 for controlling the lock-up duty is set to 0% (released).

Figure 16D:
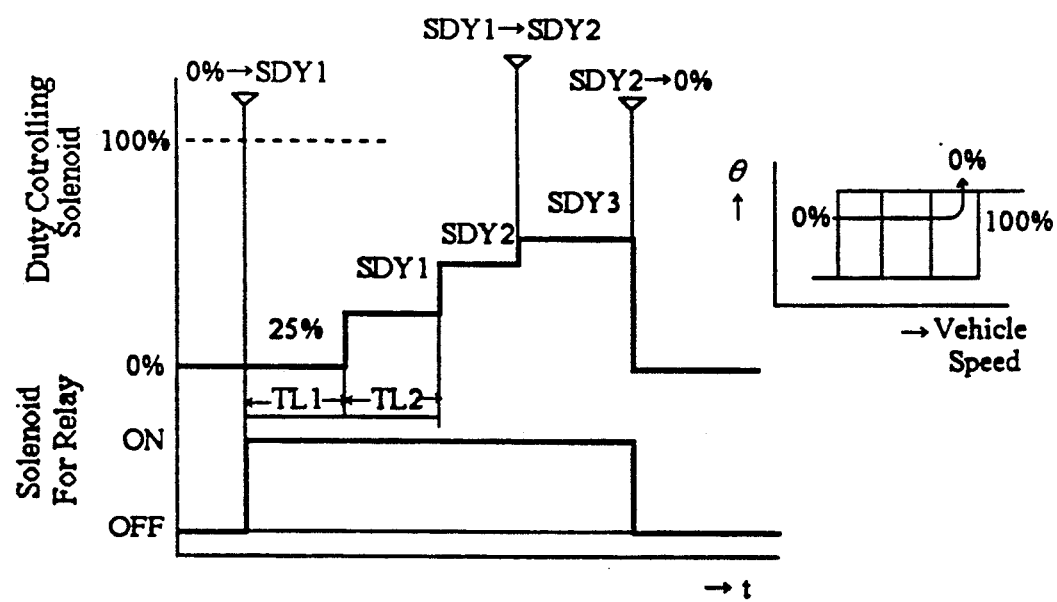

During the duty control of the lock-up in the non. speed-change control, if, for instance, the point corresponding to the throttle opening and the vehicle speed on the lock-up diagram has entered again the region 0 from the region 0 or 5 via the regions 1, 2, 3, then the duty of the solenoid valve 37 for controlling the lock-up duty is set to 0% when the point has entered the region 0 (see FIG. 16d).

Figure 16E:
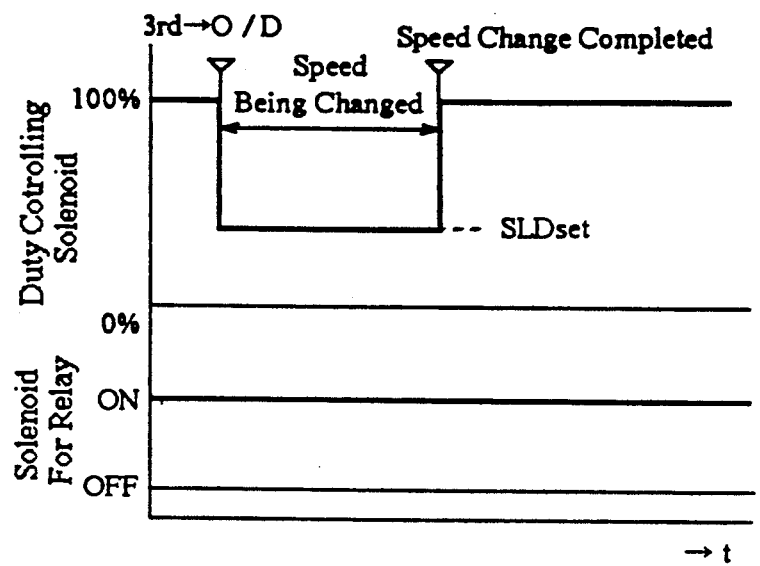

In the event that a speed change other than 1-2 or 2-1 has taken place with the lock-up completely on (duty: 100%), the duty ratio of the solenoid valve for controlling the lock-up duty is set to a predetermined value used only during the speed change (see FIG. 16e). Upon starting of the speed change, processing during speed-change control (FIG. 8) is executed. At this time, the duty ratio of the solenoid valve 37 for controlling the lock-up duty is changed to a value corresponding to the shift and the throttle opening, as shown in FIG. 17. Upon completion of the speed change, processing during non-speed-change control (FIG. 7) is executed. At this juncture, since the counter C SD is initially set to 5, the lock-up preliminary control is skipped, and the solenoid valve 37 for controlling the lock-up duty is abruptly changed to the duty value of the current region.

Figure 16F:
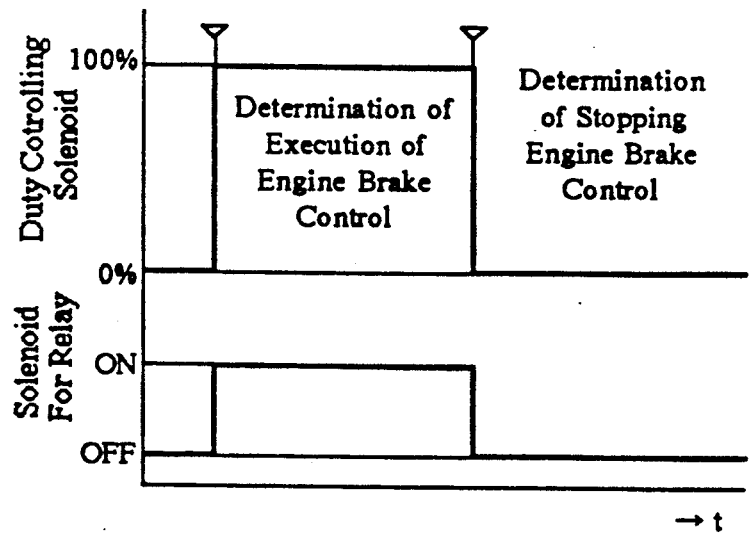

If the solenoid is being subjected to duty control during non-speed change or during speed-change, if a determination is made for executing engine brake control, the engine brake control is executed (see FIG. 16f). Immediately after the speed change has been commenced, however, the command is cleared immediately. During engine brake control, the solenoid valve 36 for the lock-up relay is set to on, and the solenoid valve 37 for controlling the lock-up duty is engaged by 100%. If a determination is made for stopping the engine brake control, the solenoid valve 36 for the lock-up relay is set to off at that point of time, and the solenoid valve 37 for controlling the lock-up duty is released.

Figure 16G:
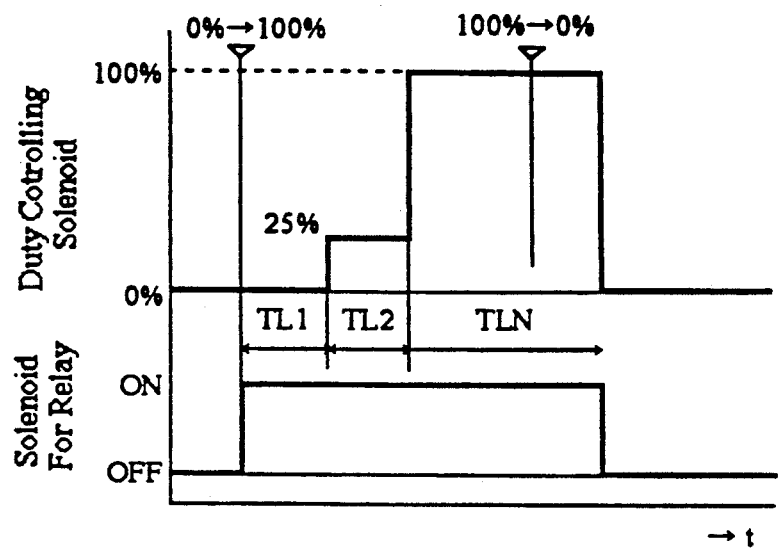

In the event that a determination for the lock-up "on" and a determination for a lock-up "off" have been made consecutively within a very short time, the lock-up "off" is effected by lagging by a predetermined time (see FIG. 16g). When a determination for the lock-up "on" is made, if the solenoid valve 37 for controlling the lock-up duty is engaged by 100%, the timer T LN is started at that point of time. While the timer T LN is being executed, the lock-up control is skipped. When the point reaches the region 0 upon termination of the timer T LN, the lock-up "off" processing is carried out.

Figure 16H:
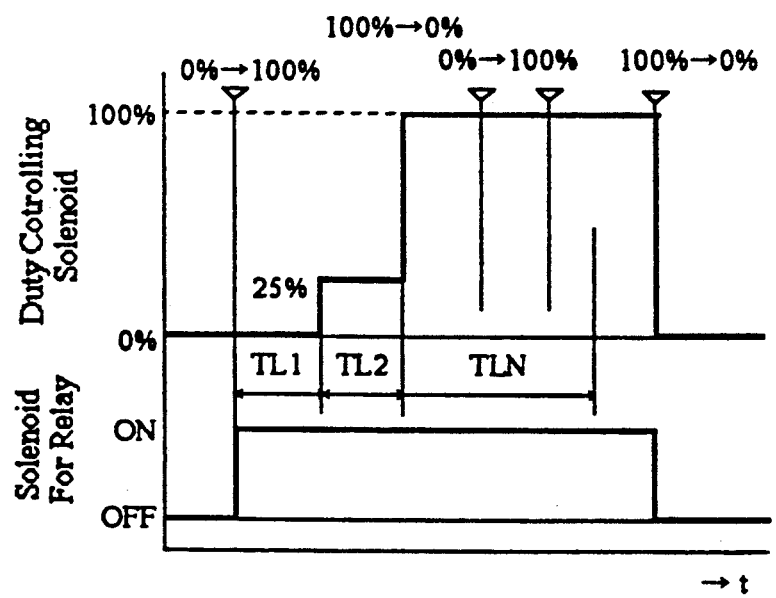

In the event that a determination for lock-up "off" is made instantaneously during the lock-up "on" (100% engagement), if that determination for lock-up "off" is made during execution of the timer T LN, the off processing is not carried out (see FIG. 16h). If the determination is made after termination of the timer T LN, the lock-up is instantly set to off.

In this embodiment, when the turbine revolution NT, i.e., the number of revolutions of the output shaft of the torque converter, exceeds the engine speed N E, i.e., the number of revolutions of the input shaft of the torque converter, the lock-up clutch is forcedly set to on by way of engine brake control. Accordingly, if the turbine revolution N T>engine speed N E, the torque is transmitted without the mediation of the torque converter. Accordingly, the working of the engine brake improves.

In addition, in this embodiment, engine brake control is not carried out when the throttle opening is not the minimum opening $\theta 0$, or when the idle switch is off. Accordingly, even when the engine brake works excessively, if the accelerator pedal is pressed down lightly, it is possible to return the state of the engine brake to a normal state.

In this embodiment, when the engine speed N E is low, the engine can possibly stop if the lock-up clutch is directly coupled, so that engine brake control is not carried out when N E<1,000 rpm.

Furthermore, an arrangement is provided for safety's sake such that engine brake control is canceled if the brake is pressed down during engine brake control. The same also holds true of a case in which the shift lever is shifted to the "N" range or the "R" range while engine brake control is being effected. As a result, when the brakes are jammed, since the lock-up is canceled immediately, the engine is prevented from stalling.

As described above, in accordance with the present invention, the arrangement is provided such that there are provided a means for an input shaft revolution detecting means (engine revolution sensor 23) for detecting the number of revolutions of the input shaft of the torque converter, an output shaft revolution detecting means (turbine revolution sensor 24) for detecting the number of revolutions of the output shaft of the torque converter, and a means (for effecting processing in which detection is carried out in Step 201 and the lock-up clutch is engaged in Step 145) for allowing the lock-up clutch to be engaged when the number of revolutions of the output shaft has exceeded the number of revolutions o the input shaft. Accordingly, the efficiency of the engine brake improves. Hence, when the vehicle is to be decelerated slowly, it becomes unnecessary not to press down the brake pedal, resulting in a reduced frequency of the use of the brake pedal, contributing to a reduced failure rate of the brake system.

In addition, since the engine brake control is effected or not effected (Step 203 or 204) in accordance with the degree of the accelerator pedal being pressed down, the driver is capable of selecting the degree of working of the engine brake. For this reason, when the driver does not wish to apply a hard engine brake, the above described engine brake control is not effected if the drive keeps on pressing down lightly on the accelerator pedal, so that it is possible to effect control in conformity with the driver's feeling.

In accordance with another aspect of the invention, the engine brake controlling apparatus further comprises a brake detecting means (brake switch 29) for detecting a braking operation, and a means for releasing the lock-up clutch (step 208) when the braking operation is detected by the brake detecting means while the means for allowing the lock-up clutch to be engaged is effecting the engagement of the lock-up clutch. Accordingly, when the brake pedal has been operated, it is possible to release the lock-up clutch with the engine brake improved as it is. Hence, the engine is prevented from stalling. Moreover, since a sudden braking with the lock-up clutched directly coupled as it is does not occur, the burn on the lock-up clutch, the automatic transmission, and the engine can be made identical with that applied to a vehicle in which engine brake control is not carried out.

What is claimed is:

1. A vehicle comprising:
an automatic transmission with a plurality of drive ratios, a torque converter and a lock-up clutch for effecting engagement and disengagement between input and output shafts of said torque converter, and an engine brake controlling apparatus for providing engine brake control independently of the vehicle's speed, said engine brake controlling apparatus comprising:
first detecting means for detecting the number of revolutions of said input shaft of said torque converter;
second detecting means for detecting the number of revolutions of said output shaft of said torque converter;
accelerator pedal detecting means for detecting a position of an accelerator pedal;
brake detecting means for detecting a brake operation of the vehicle; and
control means, connected to said first and second detecting means, to said acceleration pedal detecting means, and to said brake detecting means, for comparing the number of revolutions detected by said first and second detecting means, said control means having means for allowing said lock-up clutch to be engaged when the number of revolutions of said output shaft has exceeded the number of said revolutions of said input shaft and said accelerator pedal is detected to be in a fully released position, and means for releasing said lock-up clutch when said braking operation is detected by said braking detecting means while said means for allowing said lock-up clutch to be engaged is engaging said lock-up clutch.

* * * * *